(12) United States Patent
Hirairi

(10) Patent No.: US 6,625,633 B1
(45) Date of Patent: Sep. 23, 2003

(54) DIVIDER AND METHOD WITH HIGH RADIX

(75) Inventor: Koji Hirairi, Tokyo (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 09/585,894

(22) Filed: Jun. 1, 2000

(30) Foreign Application Priority Data

Jun. 4, 1999 (JP) .......................................... P11-158631

(51) Int. Cl.$^7$ ................................................. G06F 7/52
(52) U.S. Cl. ........................ 708/650; 708/655; 708/656
(58) Field of Search .............................. 708/650, 651, 708/652, 653, 654, 655, 656

(56) References Cited

U.S. PATENT DOCUMENTS

| | | | | |
|---|---|---|---|---|
| 3,293,418 A | * | 12/1966 | Thornton | 708/656 |
| 3,684,879 A | * | 8/1972 | Koehler | 708/656 |
| 5,097,435 A | * | 3/1992 | Takahashi | 708/655 |
| 5,177,703 A | * | 1/1993 | Mori | 708/656 |
| 5,206,827 A | * | 4/1993 | Tsuruta | 708/656 |
| 5,729,487 A | * | 3/1998 | Dufal et al. | 708/656 |
| 5,870,323 A | * | 2/1999 | Prabhu et al. | 708/650 |
| 6,109,777 A | * | 8/2000 | Jouppi et al. | 708/656 |

OTHER PUBLICATIONS

Jan Fandrianto, Algorithm for High Speed Shared Radix 8 Division and Radix 8 Square Root, Sep. 6–8, 1989, IEEE Computer Arithmetic Proceedings of 9th Symposium, pp. 68–75.*

* cited by examiner

*Primary Examiner*—Chuong Dinh Ngo
*Assistant Examiner*—Chat C Do
(74) *Attorney, Agent, or Firm*—Sonnenschein, Nath & Rosenthal LLP

(57) ABSTRACT

A high radix divider capable of reducing the size of the circuit of a quotient/remainder judgement unit in a radix $2^k$ restoring division divider for finding a quotient k number of bits at a time, comparing multiples B, 2B, and 3B of a divisor B with a remainder R in parallel in two-input comparators and a three-input comparator and performing radix 4 division by finding a quotient 2 bits at a time. At this time, using a three-input comparator 313 in the comparison of $3B=(B+2B)\leq R$ to realize comparison without the addition (B+2B), also, finding a new remainder Re in a three-input adder/subtractor for the simultaneous complex addition/subtraction R−(x+y) by a single ripple carry.

13 Claims, 11 Drawing Sheets

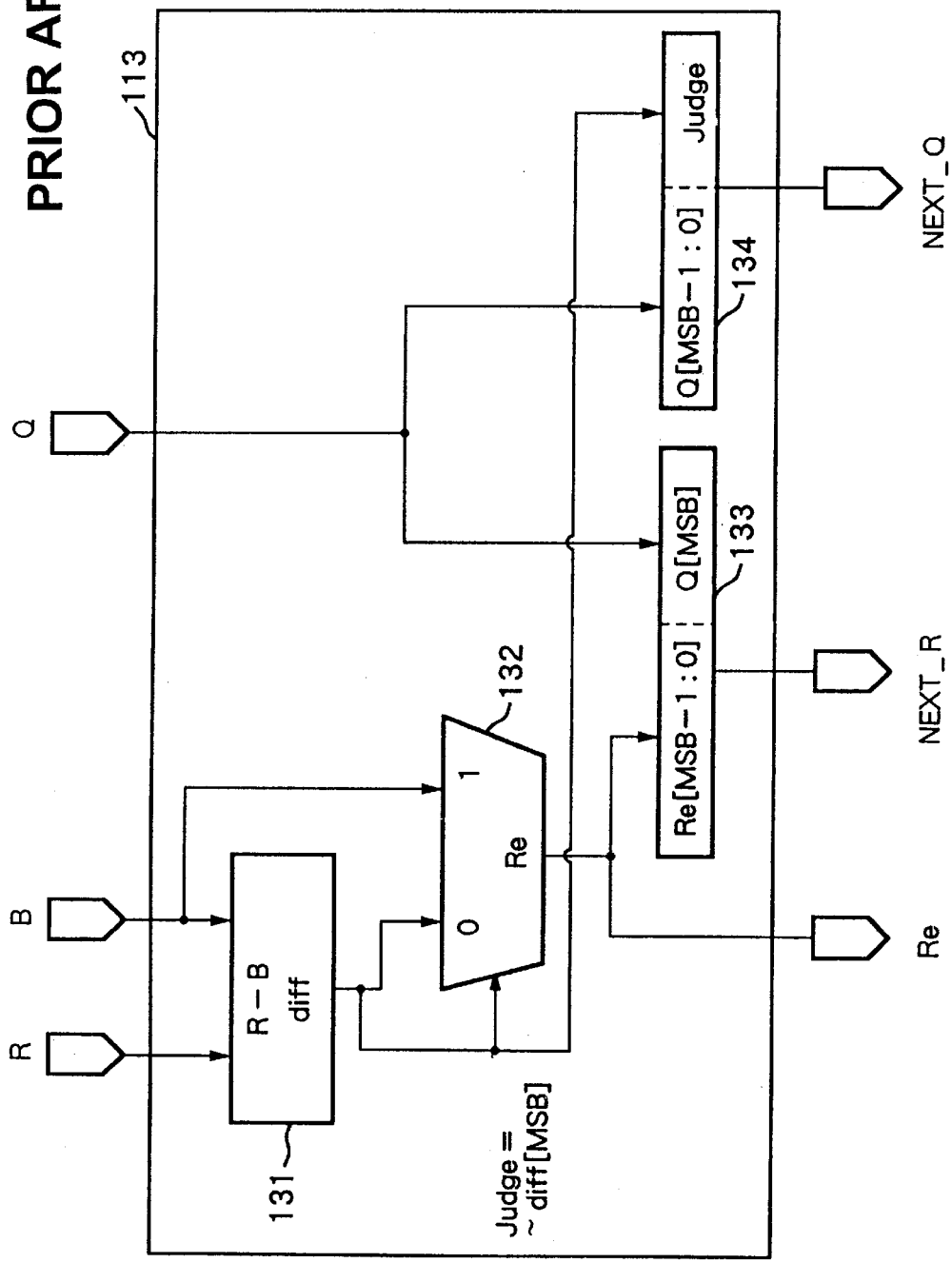

FIG. 3 PRIOR ART (RELATED ART) EXAMPLE OF RESTORING DIVISION OF RADIX 2

| CALCULATION TIMES | | | VALUE OF REGISTER | | | VALUE OF MID VARIABLE | | QUOTIENT ARRANGEMENT |
|---|---|---|---|---|---|---|---|---|
| | | | B | R | Q | Re | Judge | |
| 1 | INITIAL VALUE | | 00000000 | 00000000 | 00000000 | 00000000 | — | |
| 2 | FIRST STAGE | | 00000007 | 00000000 | 77654321 | 00000000 | 0 | |
| 3 | SECOND STAGE | 1st TIME | 00000007 | 00000000 | eeca8642 | 00000000 | 0 | |
| 4 | | 2nd TIME | 00000007 | 00000001 | dd950c84 | 00000001 | 0 | |
| 5 | | 3rd TIME | 00000007 | 00000003 | bb2a1908 | 00000003 | 0 | |
| 6 | | 4th TIME | 00000007 | 00000007 | 76543210 | 00000000 | 1 | 1 |
| 7 | | 5th TIME | 00000007 | 00000001 | eca86421 | 00000001 | 0 | |
| 8 | | 6th TIME | 00000007 | 00000003 | d950c842 | 00000003 | 0 | |
| 9 | | 7th TIME | 00000007 | 00000007 | b2a19084 | 00000000 | 1 | |
| 10 | | 8th TIME | 00000007 | 00000007 | 65432108 | 00000000 | 1 | 1 |
| 11 | | 9th TIME | 00000007 | 00000000 | ca864211 | 00000000 | 0 | |
| 12 | | 10th TIME | 00000007 | 00000001 | 950c8422 | 00000001 | 0 | |
| 13 | | 11th TIME | 00000007 | 00000003 | 2a190844 | 00000003 | 0 | |
| 14 | | 12th TIME | 00000007 | 00000006 | 54321088 | 00000006 | 0 | 0 |
| 15 | | 13th TIME | 00000007 | 0000000c | a8642110 | 00000005 | 1 | |
| 16 | | 14th TIME | 00000007 | 0000000b | 50c84221 | 00000004 | 1 | |
| 17 | | 15th TIME | 00000007 | 00000008 | a1908443 | 00000001 | 1 | |
| 18 | | 16th TIME | 00000007 | 00000003 | 43210887 | 00000003 | 0 | E |
| 19 | | 17th TIME | 00000007 | 00000006 | 8642110e | 00000006 | 0 | |
| 20 | | 18th TIME | 00000007 | 0000000d | 0c84221c | 00000005 | 1 | |
| 21 | | 19th TIME | 00000007 | 0000000c | 19084439 | 00000005 | 1 | |
| 22 | | 20th TIME | 00000007 | 0000000a | 32108873 | 00000003 | 1 | 7 |
| 23 | | 21st TIME | 00000007 | 00000006 | 642110e7 | 00000006 | 0 | |
| 24 | | 22nd TIME | 00000007 | 0000000c | c84221ce | 00000005 | 1 | |
| 25 | | 23rd TIME | 00000007 | 0000000b | 9084439d | 00000004 | 1 | |
| 26 | | 24th TIME | 00000007 | 00000009 | 2108873b | 00000002 | 1 | 7 |
| 27 | | 25th TIME | 00000007 | 00000004 | 42110e77 | 00000004 | 0 | |
| 28 | | 26th TIME | 00000007 | 00000008 | 84221cee | 00000001 | 1 | |
| 29 | | 27th TIME | 00000007 | 00000003 | 084439dd | 00000003 | 0 | |
| 30 | | 28th TIME | 00000007 | 00000006 | 108873ba | 00000006 | 0 | 4 |
| 31 | | 29th TIME | 00000007 | 0000000c | 2110e774 | 00000005 | 1 | |
| 32 | | 30th TIME | 00000007 | 0000000a | 4221cee9 | 00000003 | 1 | |
| 33 | | 31st TIME | 00000007 | 00000006 | 84439dd3 | 00000006 | 0 | |
| 34 | | 32nd TIME | 00000007 | 0000000d | 08873ba6 | 00000006 | 1 | D |
| | THIRD STAGE | | 00000007 | 00000006 | 110e774d | 00000006 | 0 | |
| | | | | REMINDER | QUOTIENT | | | |

FIG.5 PRIOR ART

RELATED ART) EXAMPLE OF RESTORING DIVISION OF OF RADIX 4

| CALCULATION TIMES | | | VALUE OF REGISTER | | | VALUE OF MID VARIABLE | | QUOTIENT ARRANGEMENT |
|---|---|---|---|---|---|---|---|---|
| | | | B | R | Q | Re | Judge | |
| 1 | INITIAL VALUE | | 00000000 | 00000000 | 00000000 | 000000000 | — | |
| 2 | FIRST STAGE | | 00000007 | 00000000 | 77654321 | 000000000 | 00 | |
| 3 | SECOND STAGE | 1st TIME | 00000007 | 00000001 | dd950c84 | 000000001 | 01 | 1 |
| 4 | | 2nd TIME | 00000007 | 00000007 | 76543210 | 000000000 | 00 | |
| 5 | | 3rd TIME | 00000007 | 00000001 | d950c841 | 000000001 | 01 | 1 |
| 6 | | 4th TIME | 00000007 | 00000007 | 65432104 | 000000000 | 00 | |
| 7 | | 5th TIME | 00000007 | 00000001 | 950c8411 | 000000001 | 01 | |
| 8 | | 6th TIME | 00000007 | 00000006 | 54321044 | 000000006 | 00 | 0 |
| 9 | | 7th TIME | 00000007 | 00000019 | 50c84110 | 000000004 | 11 | |
| 10 | | 8th TIME | 00000007 | 00000011 | 43210443 | 000000003 | 10 | E |
| 11 | | 9th TIME | 00000007 | 0000000d | 0c84110e | 000000006 | 01 | |
| 12 | | 10th TIME | 00000007 | 00000018 | 32104439 | 000000003 | 11 | 7 |
| 13 | | 11th TIME | 00000007 | 0000000c | c84110e7 | 000000005 | 01 | |
| 14 | | 12th TIME | 00000007 | 00000017 | 2104439d | 000000002 | 11 | 7 |
| 15 | | 13th TIME | 00000007 | 00000008 | 84110e77 | 000000001 | 01 | |
| 16 | | 14th TIME | 00000007 | 00000006 | 104439dd | 000000006 | 00 | 4 |
| 17 | | 15th TIME | 00000007 | 00000018 | 4110e774 | 000000003 | 11 | |
| 18 | | 16th TIME | 00000007 | 0000000d | 04439dd3 | 000000006 | 01 | D |
| | THIRD STAGE | | 00000007 | 00000006 | 110e774d | 000000006 | 00 | |
| | | | | REMINDER | QUOTIENT | | | |

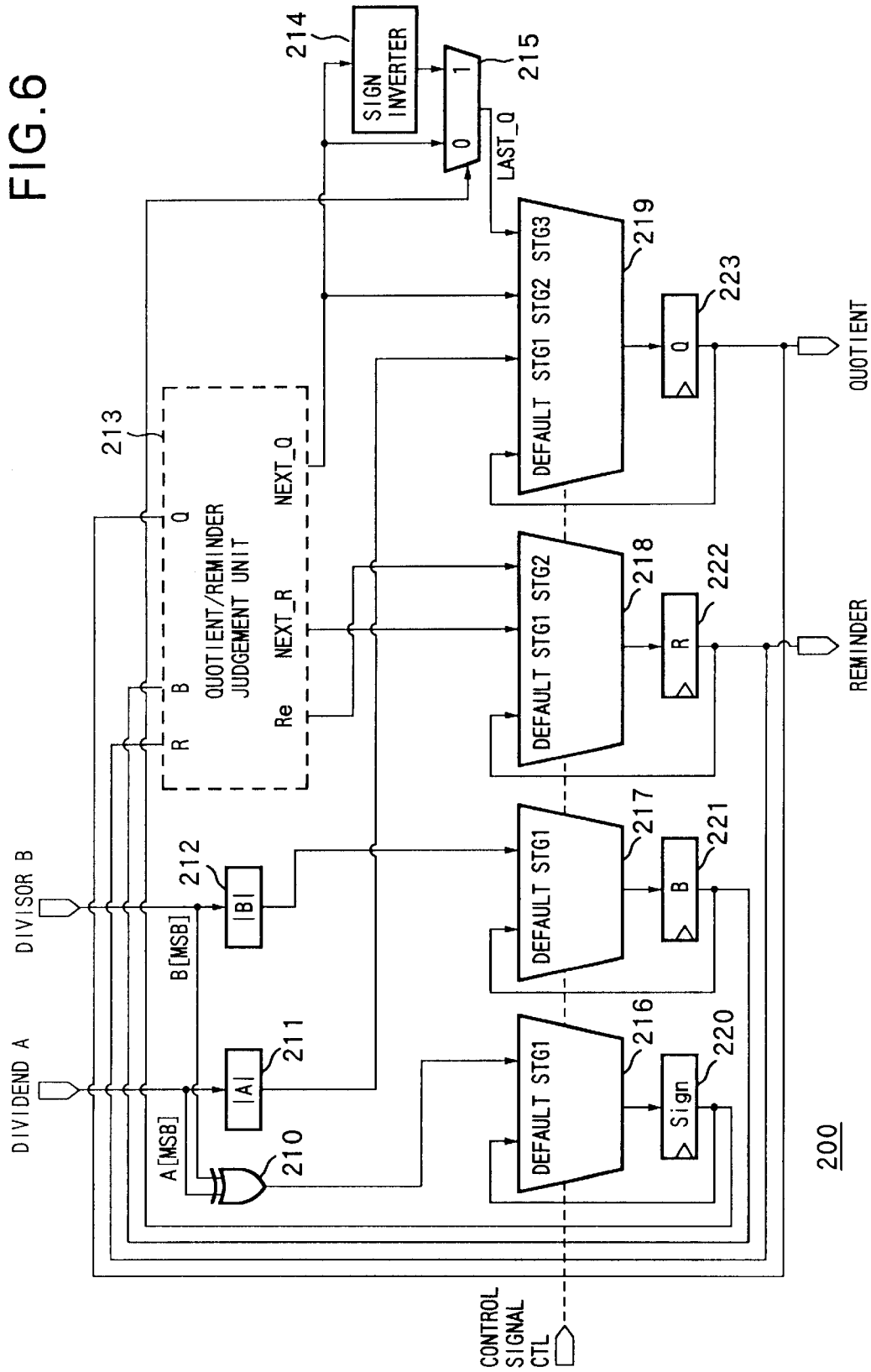

FIG.11

PRESENT INVENTION )
EXAMPLE OF RESTORING DIVISION OF RADIX 4

| CALCULATION TIMES | | | VALUE OF REGISTER | | | VALUE OF MID VARIABLE | | QUOTIENT ARRANGEMENT |
|---|---|---|---|---|---|---|---|---|
| | | | B | R | Q | Re | Judge | |
| 1 | INITIAL VALUE | | 00000000 | 00000000 | 00000000 | 00000000 | — | |
| 2 | FIRST STAGE | | 00000007 | 00000000 | 77654321 | 00000000 | 00 | |
| 3 | SECOND STAGE | 1st TIME | 00000007 | 00000001 | dd950c84 | 00000001 | 01 | 1 |
| 4 | | 2nd TIME | 00000007 | 00000007 | 76543210 | 00000000 | 00 | |
| 5 | | 3rd TIME | 00000007 | 00000001 | d950c841 | 00000001 | 01 | 1 |
| 6 | | 4th TIME | 00000007 | 00000007 | 65432104 | 00000000 | 00 | |
| 7 | | 5th TIME | 00000007 | 00000001 | 950c8411 | 00000001 | 00 | 0 |
| 8 | | 6th TIME | 00000007 | 00000006 | 54321044 | 00000006 | 11 | |
| 9 | | 7th TIME | 00000007 | 00000019 | 50c84110 | 00000004 | 10 | E |
| 10 | | 8th TIME | 00000007 | 00000011 | 43210443 | 00000003 | 01 | |
| 11 | | 9th TIME | 00000007 | 0000000d | 0c84110e | 00000006 | 11 | 7 |
| 12 | | 10th TIME | 00000007 | 00000018 | 32104439 | 00000003 | 01 | |
| 13 | | 11th TIME | 00000007 | 0000000c | c84110e7 | 00000005 | 11 | 7 |
| 14 | | 12th TIME | 00000007 | 00000017 | 21044391 | 00000002 | 01 | |
| 15 | | 13th TIME | 00000007 | 00000008 | 84110e77 | 00000001 | 01 | 4 |
| 16 | | 14th TIME | 00000007 | 00000006 | 104439dd | 00000006 | 00 | |
| 17 | | 15th TIME | 00000007 | 00000018 | 4110e774 | 00000003 | 11 | D |
| 18 | | 16th TIME | 00000007 | 0000000d | 04439dd3 | 00000006 | 01 | |
| | THIRD STAGE | | 00000007 | 00000006 | 110e774d | 00000006 | 00 | |
| | | | | REMINDER | QUOTIENT | | | |

DIVIDER AND METHOD WITH HIGH RADIX

BACKGROUND OF THE INVENTION

1. Field of the Invention

The present invention relates to a divider using restoring division for division using a dividend and divisor given by binary numbers, more particularly relates to a high radix divider for radix $2^k$ division of a dividend to find a quotient for k number of bits at a time and a method for the same.

2. Description of the Related Art

Restoring division is known as a system of a subtractor (for example, see reference John L. Hennessy, David A. Paterson, translated by Mitsuaki Narita, *Configuration and Design of Computer*, 1st volume, pp. 191 to 199, Nikkei BP Co., April 1996).

Radix 2 restoring division obtains a quotient one bit at a time from the upper bit.

In this case, when a dividend is N bits, a minimum of N number of computations becomes required. For example, when the dividend is 32 bits, a minimum of 32 computations have to be performed.

When finding a quotient one bit at a time in this way, the number of computations becomes just too large, so there is the method of increasing the number of bits of the quotient found by one computation to 2 bits or more to decrease the number of computations. This is called high radix division.

When obtaining k number of bits at a time, the operation is called radix $2^k$ division. For example, when performing radix 4 division of a 32-bit dividend, the quotient is found 2 bits at a time per computation and the minimum number of computations falls to 16. Similarly, with a radix 8, the number of computations becomes 11.

Below, radix 2 and radix 4 restoring division will be explained in detail.

Radix 2 Restoring Division

Here, the dividend is made A and the divisor is, made B. A and B are made N-bit signed binary numbers (two's complements).

Note that the MSB appearing in the following explanation expresses to the most significant bit in the binary number and indicates the (M−1)th bit in the case of an M-digit binary number.

The registers include a sign register (one digit) for storing the sign of a quotient, a B register (N digits) for storing the divisor B, an R register (N digits) for storing the remainder, and a Q register (N digits) for storing the quotient.

All registers are initialized to zero.

The routine for division explained below is divided into the three first, second, and third stages STG1 to STG3.

The first stage STG1 is a preparatory stage, the third stage STG3 is a final stage for correction of the sign of the obtained quotient, and the second stage STG2 is the central stage of the division.

Each of the stages STG1, STG2, and STG3 end upon entry into the registers. The series of operations in a stage is performed in one cycle.

[Routine]
First Stage STG1

(1) The sign bit (MSB) of the dividend A and divisor B are referred to and the sign of the quotient is found in advance and stored in the sign register. Here, when negative, the sign=1.

(2) An absolute value of the dividend A is found and entered in the Q register.

(3) An absolute value of the divisor B is found and entered in the B register.

Second Stage STG2-1

(1) R−B=diff(N digits) is calculated.

(2) When diff is not negative (MSB of diff is "0"), the divisor can be subtracted from the remainder.

At this time, the quotient judgement data Judge=1 and the new remainder is diff=R−B=Re (N digits).

On the other hand, when diff is negative, the divisor cannot be subtracted from the remainder.

At this time, the quotient judgement data Judge=0 and the new remainder is R=Re (N digits).

(3) By combining the Re, Q, and Judge and shifting by one bit to the left, the value NEXT_R of the R register and the value NEXT_Q of the next Q register are found.

Namely,

NEXT_R={(N−2)th to 0th digits of Re, (N−1)th digit of Q}

NEXT_Q={(N−2)th to 0th digits of Q, Judge}

(4) The NEXT_R and NEXT_Q are respectively entered into the R, Q registers.

Second Stage STG2-2

The above operations of (1) to (4) are carried out in one cycle.

This is repeated for N number of times.

Third Stage STG3

(1) R−B=diff (N digits) is calculated.

(2) When diff is not negative (MSB of diff is "0"), the divisor can be subtracted from the remainder.

At this time, the quotient judgement data is made Judge=1 and the new remainder is made diff=R−B=Re (N digits).

On the other hand, when diff is negative, the divisor cannot be subtracted from the remainder.

At this time, the quotient judgement data is made Judge=0 and the new remainder is made R=Re (N digits).

(3) By combining Re and Q and shifting by one bit to the left, the value of the R register NEXT_R and value of the next Q register NEXT_Q are found.

Namely,

NEXT_R={(N−2)th to 0th digits of Re, (N−1)th digit of Q}

NEXT_Q={(N−2)th to 0th digits of Q, Judge}

The explanation up to here is the same as the second stage STG2.

(4) The sign of the quotient is corrected by referring to the sign register and the final quotient LAST_Q is found.

Namely,

Sign=1 (when negative):LAST_=~NEXT_Q+1 (two's complement is taken).

Note that "~" indicates inversion.

Sign=0 (when not negative):LAST_Q=NEXT_Q

On the other hand. the final remainder is Re.

(5) The LAST_Q is entered into the Q register and Re is entered into the R register.

Here, the Q register shows the quotient and the remainder shows the R register.

The above completes the division by radix 2 restoring division.

FIG. 1 is a circuit diagram of an example of the general configuration of a restoring division subtractor.

The restoring division subtractor comprises, as shown in FIG. 1, an exclusive OR gate 110 for obtaining the sign of the quotient in the first stage STG1, absolute value generators 111 and 112 for obtaining absolute values of the dividend A and the divisor B in the first stage STG1, a quotient/remainder Judgement unit 113 for the processing of the second stage STG2, a sign inversion unit 114 for the processing of the third stage STG3, a selector 115, stage selecting selectors 116 to 119 operated by a control signal CTL, a sign register 120, a B register 121, an R register 122, and a Q register 123.

The quotient/remainder judgement unit 113 is for realizing the second stage STG2-1 in the above explained routine. An example of the configuration is shown in FIG. 2.

As shown in FIG. 2, the quotient/remainder judgement unit 113 is comprised by a subtractor 131 for subtraction of (R−B) in the processing of the above second stage STG2-1(1), a selector 132 for obtaining a new remainder Re based on the quotient judgement in the processing of the second stage2-1(2), and bit matchers 133 and 134 for the processing of the second stage STG2-1(3).

In a restoring division subtractor configured in this way, by properly giving a control signal CTL, the operations of the above first stage STG1, second stage STG2, and third stage STG3 are switched.

FIG. 3 is a view of the process of the operation of the subtractor.

In this example, 77654321h/00000007h was calculated.

When looking at the column "Judge" in FIG. 3, the process by which the quotient is found bit by bit from the upper bit can be understood.

Radix 4 Restoring Division

The case of a radix 4 differs from the case of a radix 2 in the point that the quotient is obtained 2 bits at a time. Also, only the part of the second stage STG2-1 differs in the routine of the above restoring division.

[Routine]

Second Stage 2-1

(1) 2B(N+1 digits) is found by bit shifting. 3B(N+2 digits) is found from 2B+B.
Then, $R-3B=\text{diff3}(N+2 \text{ digits})$ $R-2B=\text{diff2}(N+1 \text{ digits})$ $R-B\text{diff1}(N \text{ digits})$ are calculated in parallel.

(2) If diff3 is not negative ((N+1)th bit is "0"), the new remainder is made diff3=R−3B=Re (N digits, upper 2 bits truncated) and the quotient judgement is made Judge=11 (2 digits).

If diff3 is negative and diff2 is not negative (Nth bit is "0"), the new remainder is made diff2=R−2B=Re (N digits, upper 1 bit truncated) and the quotient judgement is made Judge=10 (2 digits).

If diff3 is negative, diff2 is negative, and diff1 is not negative ((N−1)th bit is "0"), the new remainder is made diff1=R−B=Re (N digits) and the quotient judgement is made Judge=01 (2 digits).

If diff3, diff2, and diff1 are all negative, the new remainder is made R=Re (N digits) and the quotient judgement is made Judge=00 (2 digits).

(3) By combining Re and Q and shifting the result two bits to the left, the value of the next R register NEXT_R and the value of the next Q register NEXT_Q are found.
Namely, NEXT_R={(N−3)th to 0th digits of Re, (N−1)th to (N−2)th digits of Q}

NEXT_Q={(N−3)th to 0th digits of Q, Judge}

(4) Next_R and NEXT_Q are respectively entered into the R and Q registers.

FIG. 4 is a circuit diagram of the conventional configuration of a radix 4 quotient/remainder judgement unit based on the routine (second stage 2-1).

The quotient/remainder judgement unit 113a is comprised by, as shown in FIG. 4, a shifter 141 for obtaining 2B, an adder 142 for obtaining 3B, and subtractors 143 to 145 for obtaining diff1, diff2, and diff3 in the processing of the second stage 2-1(1), selectors 146 to 148 for obtaining a new remainder Re based on a sign bit of the subtraction result in the processing of the second stage STG2-1 (2), selectors 149 to 151 for obtaining quotient judgements, and bit matchers 152 and 153 for the processing of the second stage STG2-1(3).

FIG. 5 is a view of the process of the operation of the divider.

In this example as well, 77654321h/00000007h was calculated in the same way as in the above case of a radix 2.

As clear from FIG. 5, since the quotient is found 2 bits at a time in the second stage STG2, the number of computations required in the second stage STG2 is 16. It was 32 times in the case of a radix 2.

In this way, the number of computations can be reduced by using a high radix.

The above explained radix 2 quotient/remainder judgement unit 113 in FIG. 2 requires one N-bit width subtractor 131 and one N-bit width 2:1 selector 132.

On the other hand, the radix 4 quotient/remainder judgement unit 113 in FIG. 4 requires one (N+1) bit width adder 142 for 2B+B, one N-bit width subtractor 145 for (R−B), one (N+1) bit width subtractor 144 for R−2B, three N-bit width 2:1 selectors, and three two-bit width 2:1 selectors 149 to 151.

In this way, in a high radix subtractor, there is the disadvantage that the number of processors required increases remarkably and the circuit becomes large in size.

SUMMARY OF THE INVENTION

An object of the present invention is to provide a high radix divider capable of reducing the size of the circuit of the quotient/remainder judgement unit of a high radix restoring division divider and a method for the same.

According to a first aspect of the present invention, there is provided a high radix divider for radix $2^k$ division of a dividend A by a divisor B to find a quotient for k number of bits at a time, comprising a multiple generating means for shifting bits of the divisor B to generate $2^s \times B$ (s is a non-negative integer including "0" and s≦k); a first comparator for receiving as input the divisor B and a remainder R, judging whether the divisor B is equal to or smaller than the remainder R, and outputting the judgement result; at least one second comparator for receiving as input the $2^s \times B$ generated by the multiple generating means and the remainder R, judging whether $2^s \times B$ is equal to or smaller than the remainder R, and outputting the judgement result; at least one three-input comparator having a 3:2 compressor stage for receiving as input $2^s \times B$, $+/-2^t (t<s) \times B$, and a remainder R as three m-bit width binary numbers, converting the total to two m-bit width binary numbers (co, S), and outputting the same, and a non-negative judgement stage for judging whether the total value is non-negative based on the two binary numbers (Co, S) output from the above 3:2 compressor stage; a selection circuit for obtaining a first output y selecting one of $2^s \times B$ and "0" and a second output z selecting one of the divisor B and "0" in accordance with a comparison result of the three-input comparator, second comparator, and first comparator; a three-input adder/subtractor for receiving as input the remainder R and first output and second output of the selection circuit as three m-bit width binary numbers and performing complex addition and subtraction of $\{R-(y+z)\}$ in parallel by a single ripple carry to find a new remainder Re; and a matcher for performing bit matching in accordance with a comparison result of the three-input comparator, second comparator, and first comparator to determine a quotient Q.

Further, in the present invention, the 3:2 compressor stage of said three-input comparator comprises an m-bit width 3:2 compressor for receiving as input two binary numbers $2^s \times B$ and $+/-2^t (t<s) \times B$ as they are for each bit and for receiving as input one binary number R by taking a negation of each bit.

Further, in the present invention, a non-negative judgement comparator of the three-input comparator comprises an m-digit adder having 0 to m−1 number of inputs A and inputs B forming m number of pairs and a carry-in input Cin, has the 0th digit S-output of the 3:2 compressor stage as the input of the carry-in input Cin, has the corresponding 0th to (m−1)th digit Co outputs as the B0 to Bm−1 inputs, has the i(i<m)th digit S-output as the (i−1) A-input, and has the (m−1) digit S-output as the Am−1 input and the three-input comparator judges and outputs the (m−1)th digit SUMm−1 of an addition output of the adder.

Further, in the present invention, the m-digit adder comprises only by logic gates relating to generation of an (m−1)th digit SUMm−1 of the addition output.

Further, in the present invention, the three-input adder/subtractor comprises a 3:2 compressor stage for converting a total of three m-bit width binary numbers to two m-bit width binary numbers (Co, S) for output and an m-digit adder for finding the sum of the digits based on the two binary numbers (Co, S) output from the 3:2 compressor stage.

Further, in the present invention, the 3:2 compressor stage of the three-input adder/subtractor comprises an m-bit width 3:2 compressor receiving as input one binary number R as it is for each bit and receiving as input two binary numbers y and z by taking a negation of each bit.

Further, in the present invention, an m-digit adder of the three-input adder/subtractor has 0 to m−1 number of inputs A and inputs B forming m number of pairs and a carry-in input Cin, has a logic "1" as the input of a carry-in input Cin, has the corresponding 0th digit to (m−1) digit Co outputs as the B0 to Bm−1 inputs, has the i(i<m)th digit S outputs as the (i−1) number of A inputs, and has the (m−1)-digit S outputs as the Am−1 number of inputs and the three-input adder/subtractor uses the SUM0 to SUMm−1 of the addition outputs of the m-digit adder and the 0th digit S output of the 3:2 compressor as the output of the result of addition/subtraction.

Further, in the present invention, the selection circuit comprises a first selector for selecting one of different k-bit first and second judgement data in accordance with a judgement result of the first comparator; a second selector for selecting one of a further different k-bit third judgement data and the first or second judgement data selected by the first selector in accordance with a judgement result of the second comparator; a third selector for selecting one of a further different fourth judgement data and the first, second, or third judgement data selected by the second selector in accordance with a judgement result of the three-input comparator and outputting the selected data to the matcher as quotient judgement data; a fourth selector for selecting one of $2^s \times B$ or "0" based on an upper bit of the quotient judgement data to select the first output y; and a fifth selector for selecting one of B or "0" based on a lower bit of the quotient judgement data to select the second output z.

Further, in the present invention, the selection circuit selects the fourth judgement data as quotient Judgement data regardless of a Judgement result of the second and first comparators when obtaining a judgement result that (B+2B) is equal to or smaller than a remainder R in the three-input comparator, selects the third judgement data as quotient judgement data regardless of a judgement result of the first comparator when obtaining a judgement result that (B+2B) is larger than a remainder R in the three-input comparator and obtaining a judgement result that ($2^s \times B$) is equal to or smaller than a remainder R in the second comparator, and selects the first or second judgement data as quotient judgement data when obtaining a judgement result that $2^s \times B$ is larger than a remainder R in the second comparator.

According to a second aspect of the present invention, there is provided high radix divider for radix 4 division of a dividend A by a divisor B to find a quotient for 2 number of bits at a time, comprising a multiple generating means for shifting the bits of the divisor B to generate 2B; a first comparator for receiving as input the divisor B and a remainder R, judging whether the divisor B is equal to or smaller than the remainder R, and outputting the judgement result; a second comparator for receiving as input the 2B generated by the multiple generating means and the remainder R, judging whether 2B is equal to or smaller than the remainder R, and outputting the judgement result; a three-input comparator comprising a 3:2 compressor stage for receiving as input the 2B, B, and a remainder R as three m-bit width binary numbers, converting the total to two m-bit width binary numbers (Co, S), and outputting the same and a non-negative judgement stage for judging whether or not the total value is non-negative based on the two binary numbers (Co, S) output from the 3:2 compressor stage; a selection circuit for obtaining a first output y selecting one of 2B and "0" and a second output z selecting one of the divisor B and "0" in accordance with a comparison result of the three-input comparator, second comparator, and a third comparator; a three-input adder/subtractor for receiving as input a remainder R and the first output y and second output z of the selection circuit as three m-bit width binary numbers and performing complex addition and subtraction of {R−(y+z)} in parallel by a single ripple carry to find a new remainder Re; and a matcher for performing bit matching to determine a quotient Q in accordance with a comparison result of the three-input comparator, second comparator, and first comparator.

According to a third aspect of the present invention, there is provided a high radix division method for radix $2^k$ division of a dividend A by a divisor B to find a quotient by k number of bits at a time, including a step of shifting the bits of the divisor B to generate $2^s$ (s is a non-negative integer including "0" and s≦k)×B; a first comparison step of comparing the divisor B and a remainder R to judge whether the divisor B is equal to or smaller than the remainder R; a second comparison step of comparing $2^s \times B$ and the remainder R to judge whether $2^s \times B$ is equal to or smaller than the remainder R; a third comparison step of converting a total of $2^s \times B$, $+/-2^t (t<s) \times B$, and the remainder R as three m-bit width binary numbers to two m-bit width binary numbers (Co, S) and judging whether the total value is non-negative based on the two binary numbers (Co, S); a step of obtaining a y selecting one of $2^s \times B$ or "0" and z selecting one of B or "0" in accordance with a comparison result of the third, second, and first comparison steps; a step of performing complex addition and subtraction of {R−(y+z)} in parallel by a single ripple carry to find a new remainder Re; and a step of performing bit matching to determine a quotient Q in accordance with a comparison result of the third, second, and first comparison steps; wherein the first comparison step, second comparison step, and third comparison step are performed in parallel.

According to the present invention, $2^s \times B$ (s is a non-negative integer including "0" and $s \leq k$) is generated by shifting the bits of the divisor B in the multiple generating means and supplied to the second comparator and the three-input comparator.

Then, the following comparison operations are performed in parallel in the first comparator, second comparator, and three-input comparator.

In the first comparator, a divisor B and a remainder R are input, whether the divisor B is equal to or smaller than the remainder R is judged, and the judgement result is output to a selection circuit.

In the second comparator, the $2^s \times B$ generated in the multiple generating means and the remainder R are input, whether $2^s \times B$ is equal to or smaller than the remainder R is judged, and the judgement result is output to the selection circuit.

In the three-input comparator, the three m-bit width binary numbers $2^s \times B$, $+/-2^t(t<s)B$, and remainder R are input, the total of the same is converted to two m-bit width binary numbers (Co, S) in the 3:2 compressor stage, whether the total value is non-negative based on the two binary numbers (Co, S) output from the 3:2 compressor is judged in the non-negative judgement stage, and the judgement result is output to the selection circuit.

In accordance with the comparison results of the three-input comparator, second comparator, and first comparator, in the selection circuit, one of $2^s \times B$ or "0" is selected to obtain a first output y while one of B or "0" is selected to obtain a second output z and the same is supplied to the three-input adder/subtractor.

In the three-input adder/subtractor, the complex addition and subtraction $\{R-(y+z)\}$ are performed in parallel by a single ripple carry and the new remainder Re is found.

Then, in accordance with the comparison results of the three-input comparator, second comparator, and first comparator, the bit matching is performed and the quotient Q is determined in the matcher.

Also, in the so-called multiple comparison method in the three-input comparator, it is possible to use methods as in the following examples based on for example numbers of multiples of $+/-2^s$ such as $+/-B$, $+/-2B$, $+/-4B$, $+/-8B$, and $+/-16B$ generated by the multiple generating means.

$$3B=(B+2B) \leq R$$

$$5B=(B+4B) \leq R$$

$$6B=(2B+4B) \leq R$$

$$7B=(-B+8B) \leq R$$

$$9B=(B+8B) \leq R$$

$$10B=(2B+8B) \leq R$$

$$12B=(4B+8B) \leq R$$

$$14B=(-4B+16B) \leq R$$

$$15B=(-1B+16B) \leq R$$

$$17B=(B+16B) \leq R$$

$$18B=(2B+16B) \leq R$$

$$20B=(4B+16B) \leq R$$

$$24B=(8B+16B) \leq R$$

BRIEF DESCRIPTION OF THE DRAWINGS

These and other objects and features of the present invention will become clearer from the following description of the preferred embodiments given with reference to the accompanying drawings, in which:

FIG. 2 is a circuit diagram of the conventional configuration of a quotient/remainder judgement unit of a radix 2 restoring division divider;

FIG. 3 is a view of an example of a radix 2 restoring division divider;

FIG. 5 is a view of an example of a radix 4 restoring division by a conventional high radix divider;

FIG. 6 is a circuit diagram of an embodiment of a high radix divider according to the present invention;

FIG. 11 is a view of an example of radix 4 restoring division by a high radix divider according to the present invention.

DESCRIPTION OF THE PREFERRED EMBODIMENTS

Figure 1:
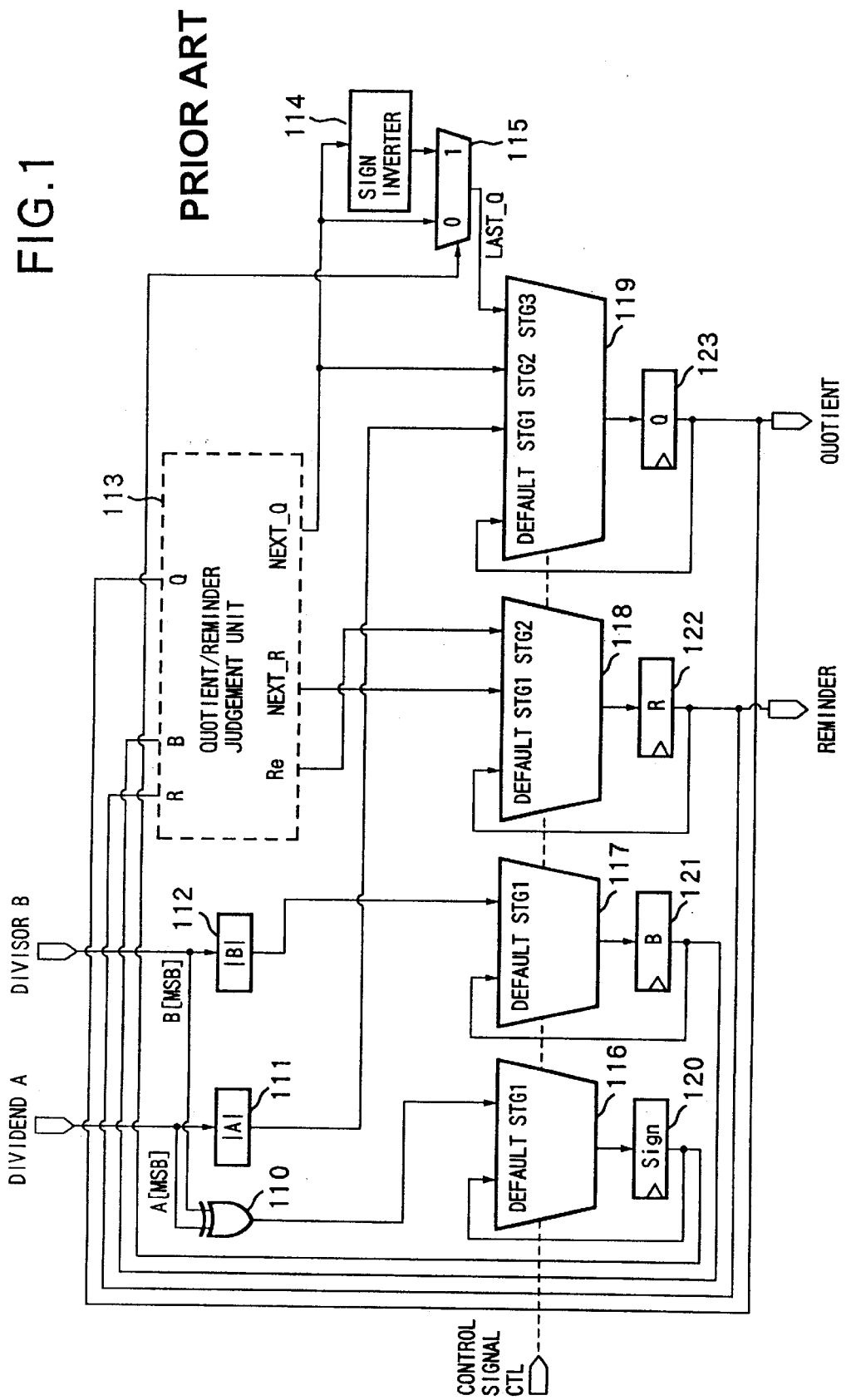
FIG. 1 is a circuit diagram of an example of the general configuration of a restoring division divider.

Below, preferred embodiments will be described with reference to the accompanying drawings.

FIG. 6 is a circuit diagram of an embodiment of a high radix divider according to the present invention.

The high radix divider 200 comprises, as shown in FIG. 6, an exclusive OR gate 210 for obtaining the sign of a quotient in the first stage STG1, absolute value obtainers 211 and 212 for obtaining absolute values for the dividend A and the divisor B in the first stage STG1, a quotient/remainder judgement unit 213 for the processing of the second stage STG2, a sign inverter 214 for the processing in the second stage STG2, a selector 215, stage selectors 216 to 219 operated by a control signal CTL, a sign register 220, a B (divisor) register 221, an R (remainder) register 222, and a Q (quotient) register 223.

The block configuration of the high radix divider 200 shown in FIG. 6 is the same as that of FIG. 1. The specific configuration of the quotient/remainder judgement unit 213 is different.

Processing wise, the first stage STG1 and the third stage STG3 are substantially the same as the processing explained with reference to FIG. 1 and FIG. 2. The processing of the second stage STG2, more particularly the processing of STG2-1, is different from that of the prior art.

Therefore, the explanation will be given with reference to the drawings focusing on the configuration and function of the quotient/remainder judgement unit 213.

Figure 7:
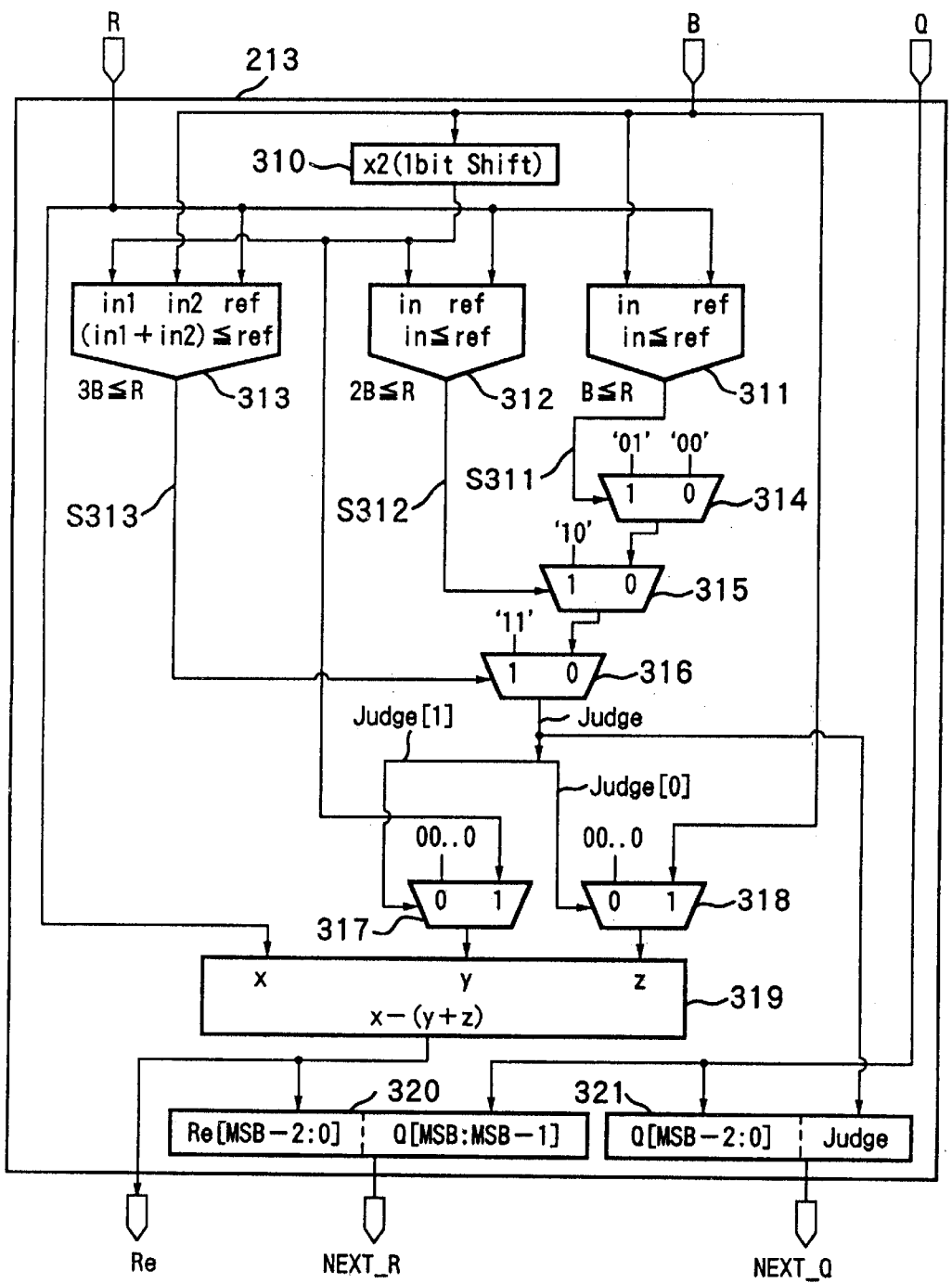
FIG. 7 is a circuit diagram of a specific example of the configuration of the quotient/remainder judgement unit in FIG. 6 characterizing the present invention.

FIG. 7 is a circuit diagram of a specific example of the configuration of the quotient/remainder judgement unit 213 in FIG. 6—the characterizing portion of the present invention.

The quotient/remainder judgement unit 213 is, as shown in FIG. 7, comprised by a shifter 310 serving as a multiple generating means, an N-digit comparator 311 for B≦R, an (N+1)-digit comparator 312 for 2B≦R, an (N+1)-digit three-input comparator 313 for 3B≦R, 2-digit 2:1 selectors (first to third selectors) 314 to 316 for quotient judgement, (N+1)-digit 2:1 selectors (fourth and fifth selectors) 317 and 318 for y and z, an (N+1)-digit three-input adder 319 for obtaining a new remainder Re, and bit matchers 320 and 321.

The shifter 310 shifts the divisor B stored in the B register 221 by one bit to generate 2B and supplies the result to the comparator 312 and three-input comparator 313.

The N-digit comparator 311 receives as input the divisor B stored in the B register 221 by an input terminal in and the remainder R stored in the R register 222 by an input terminal ref, Judges whether the divisor B is equal to or smaller than the remainder R, and outputs the judgement result as a signal S311 to a control terminal of the selector 314.

Specifically, when the divisor B is equal to or smaller than the remainder R, that is, in the case of an affirmative judgement result, the signal S311 is output with the logic "1" (cmp_b1=1), while in the case of a negative judgement result, the signal S311 is output with the logic "0" (cmp_b1=0).

The (N+1)-digit comparator 312 receives as an input 2B from the shifter 310 at an input terminal in, receives as input a remainder R stored in the R register 222 at an input terminal ref, judges whether 2B is equal to or smaller than the remainder 2B, and outputs the judgement result as a signal S312 to a control terminal of the selector 315.

Specifically, when the multiple 2B of the divisor B is equal or smaller than the remainder R, that is, in the case of an affirmative judgement result, a signal S312 is output with the logic "1" (cmp_b2=1), while in the case of a negative judgement results, the signal S312 is output with the logic "0" (cmp_b2=0).

The (N+1)-digit three-input comparator 313 receives as input 2B from the shifter 310 at an input terminal in1, receives as input the divisor B stored in the B register 221 at an input terminal in2, receives as input a remainder R stored in the R register 222 at an input terminal ref, compares (2B+B) and the remainder R without finding the sum of 2B input to the input terminal in1 and B input to the input terminal in2, judges whether (2B+B) is equal to or smaller than the remainder R, and outputs the judgement result as a signal S313 to a control terminal of the selector 316.

Specifically, when 3B is equal to or smaller than the remainder R, that is, in a case of an affirmative judgement result, a signal S313 is output with the logic "1" (cmp_b3=1), while in the case of a negative judgement result, the signal S313 is output with the logic "0" (cmp_b3=0).

Below, the principle of the three-input comparator 313 will be explained.

Here, X, Y, and Z are M-digit signed binary numbers.
(Principle)

The inequality to be judged $(X+Y) \leq Z$ is modified to $(X+Y)-Z \leq 0$.

As a result, the evaluation of the inequality boils down to the issue of evaluating the sign (negative, non-negative) of the left side of the inequality.

When modifying this assuming that $-Z$ is a 2's complement, the left side becomes $$(X+Y)-Z=X+Y+\sim Z+1$$

Note that "$\sim$" indicates inversion.

Furthermore, by modifying the same to $$X+Y+\sim Z+1 \leq 0$$

$$X+Y+\sim Z \leq -1<0$$

the sign bit of the result of the addition $(X+Y+\sim Z)$ can be made to indicate the truth value of the inequality.

The 3:2 compressor is used to find the M-digit binary numbers Co, S able to be expressed by $$X+Y+\sim Z=2Co+S$$

Here, when focusing on the fact that the 0th digit of (2*Co) is always "0", the equation can be modified to (M−1)th digit to 0th digit of Co+{(M−1)th digit of S, (M−1)th digit to 1st digit of S} (sign expansion)+0th digit of S and can be calculated by an M-digit adder having a carry input.

What is needed here is the sign bit of the addition result. It is not necessary to obtain other bits.

Therefore, it is possible to use an adder wherein logic circuits having no relation with generation of the sign bit ((M−1)th digit of the addition) are omitted.

Figure 8:
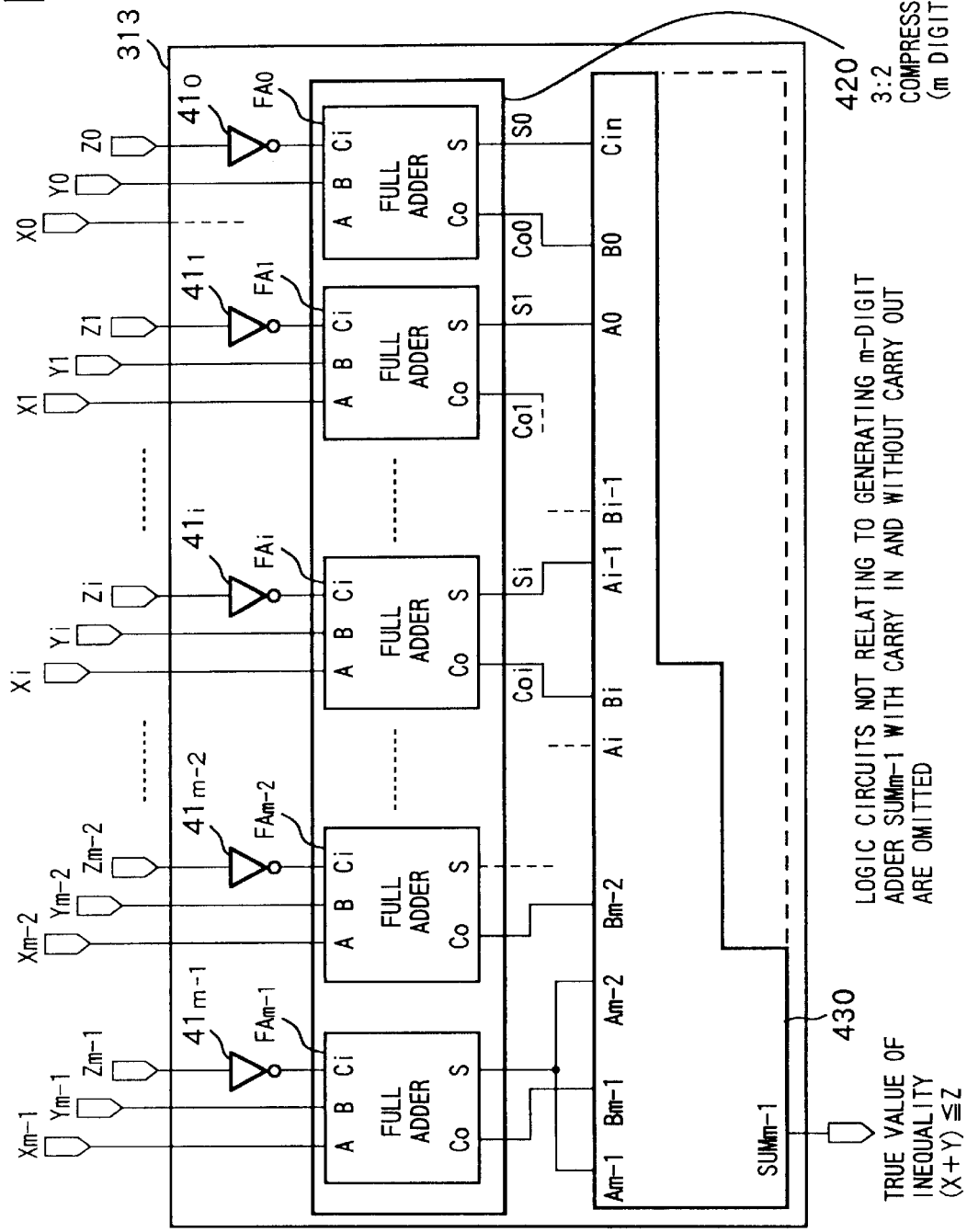
FIG. 8 is a circuit diagram of a specific example of the configuration of a three-input comparator corresponding to an inequality $(X+Y) \leq Z$ according to the present invention.

FIG. 8 is a circuit diagram of a specific example of the configuration of an m-digit three-input comparator according to the present invention.

The three-input comparator 313 is comprised by NOT gates 410 to 41m−1 for making "Z" "∼Z", a 3:2 compressor 420, and an adder 430 serving as a non-negative judgement stage.

The 3:2 compressor 420 is comprised of full adders FA0 to FAm−1 arranged corresponding to the number of digits.

Input terminals A of the adders FA0 to FAm−1 receive as input a corresponding X (0 to m−1; 2B in FIG. 7), input terminals B receive as input Y (0 to m−1; B in FIG. 7), and input terminals Ci receive as input ∼Z (0 to m−1; R in FIG. 7) inverted in the NOT gates 410 to 41m−1.

The adder 430 is an adder having an m-digit carry-in where logic gates having no relation with generation of the most significant bit (SUMm−1) of the sum are omitted.

An input terminal Cin of the adder 430 is connected to a terminal S of a full adder FA0. An input terminal B0 is connected to a terminal Co of the full adder FA0, and a terminal A0 is connected to the terminal S of the full adder FA1.

Similarly, an input terminal Bi−1 is connected to a terminal Co of a full adder FAi−1, an input terminal Ai−1 is connected to a terminal S of a full adder FAi, and an input terminal Bi is connected to a terminal Co of the full adder FAi.

Further, an input terminal Bm−2 is connected to a terminal Co of a full adder FAm−2, input terminals Am−2 and Am−1 are connected to a terminal S of a full adder FAm−1, and an input terminal Bm−1 is connected to a terminal Co of the full adder FAm−1.

Note that the m-digit input comparator shown in FIG. 8 corresponds to the inequality $(X+Y) \leq Z$ and can sufficiently handle radix 4 division.

In the case of a radix 8, however, it is necessary to compare 7B with the remainder, but 7B can be found by subtracting B from 8B.

Accordingly, in the circuit in FIG. 8, it is impossible to handle the above and it is necessary to use a circuit corresponding to the inequality $(X-Y) \leq Z$ instead of the inequality $(X+Y) \leq Z$.

$B$ $2B$ $3B=B+2B$ $4B$ $5B=B+4B$ $6B=2B+4B$ $7B=8B-B$

Figure 9:
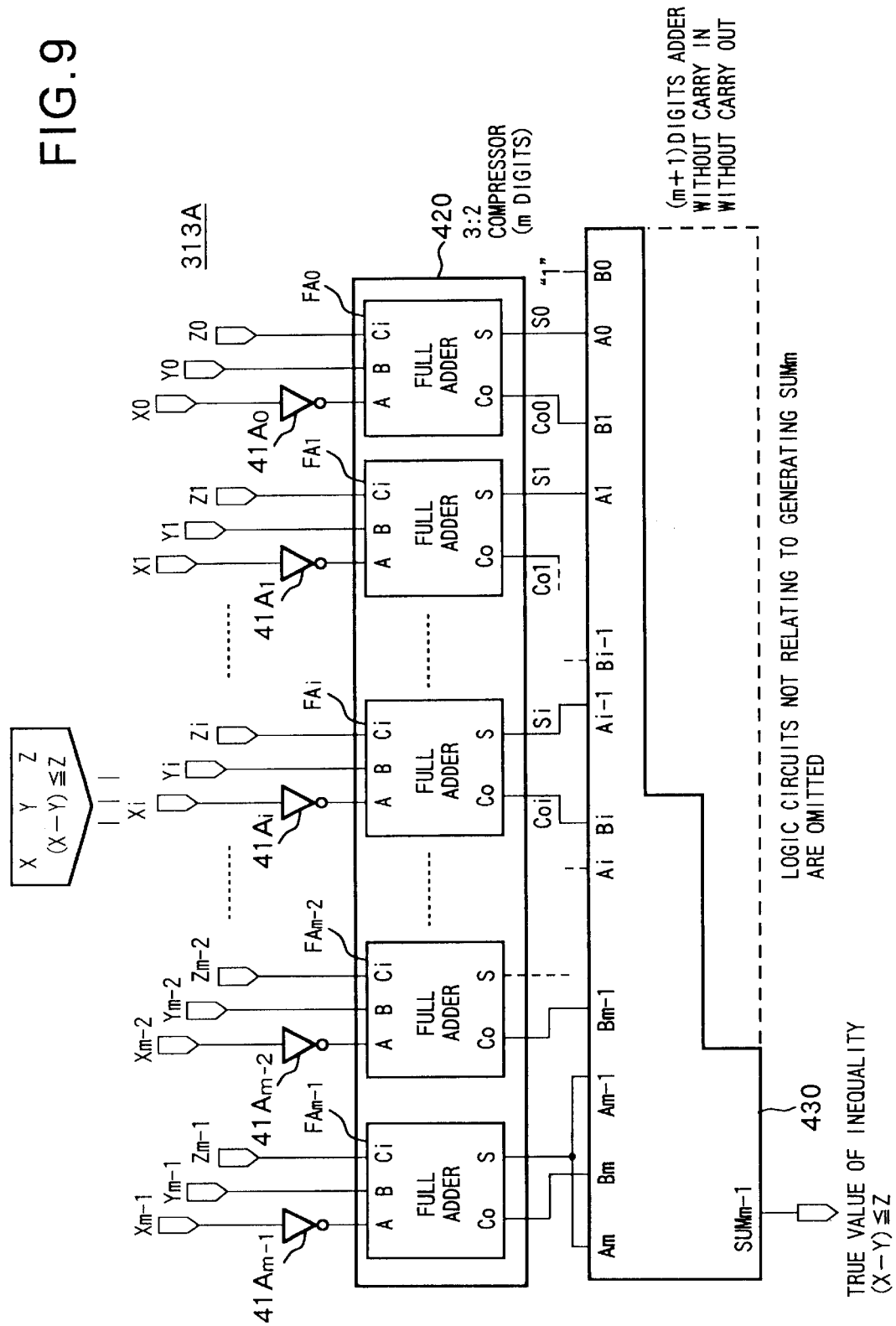
FIG. 9 is a circuit diagram of an specific example of the configuration of an m-digit three-input comparator corresponding to an inequality $(X-Y) \leq Z$ according to the present invention.

FIG. 9 is a circuit diagram of a specific example of the configuration of a m-digit three-input comparator corresponding to the inequality $(X-Y) \leq Z$.

The point of difference of the m-digit three-input comparator 313A from the comparator 313 of FIG. 8 is that NOT gates 41A0 to 41Am-1 for making "X" "~X" are provided instead of providing NOT gates 410 to 41m-1 for making "Z" "~Z". The rest of the configuration is the same as that of the circuit in FIG. 8. The explanation of the detailed connections will be omitted here.

Below, the principle of a three-input comparator of the $(X-Y) \leq Z$ type will be explained.

The inequality $(X-Y) \leq Z$ to be evaluated is modified to $Z+Y-X \geq 0$.

As a result, the evaluation of the inequality boils down to the issue of evaluating the sign (negative, non-negative) of the left side of the inequality sign.

When modifying the same assuming that $-X$ is a 2's complement, $Z+Y+\sim X+1 \geq 0$ This is, as shown in FIG. 9, realized by combining the 3:2 compressor and an adder.

The selector 314 selects and outputs the 2-bit first judgement data "01" when receiving the output signal S311 of the comparator 311 at the logic "1" at its control terminal, while selects and outputs the 2-bit second judgement data "00" when receiving the output signal S311 at the logic "0".

The selector 315 selects and outputs the 2-bit third judgement data "01" when receiving the output signal S312 of the comparator 312 at the logic "1" at its control terminal, while selects and outputs the 2-bit first or second judgement data "01" or "00" selectively output from the selector 314 when receiving the output signal S312 at the logic "0".

The selector 316 selects and outputs the 2-bit fourth judgement data "11" when receiving the output signal S313 of the comparator 313 at the logic "1" at its control terminal, selects the 2-bit third, second or first judgement data "10", "01", or "00" selectively output from the selector 315 when receiving the output signal S313 at the logic non, outputs as quotient data "judge" to the bit matcher 321, outputs the upper one bit of the quotient judgement data "judge" to the control terminal of the selector 317, and outputs the lower one bit to the control terminal of the selector 318.

The quotient judgement data of the output of the selector 316 becomes "11" regardless of the comparison results of the comparators 311 and 312 when the output signal S313 of the three-input comparator 313 is the logic "1" (cmp_b3=1).

The quotient judgement data "judge" becomes "10" regardless of the comparison result of the comparator 311 when the output signal S313 of the three-input comparator 313 is the logic "0" (cmp_b3=0) and the output signal S312 of the comparator 312 is the logic "1" (cmp_b2=1).

The quotient judgement data "judge" becomes "01" when the output signal S313 of the three-input comparator 313 is the logic "0" (cmp_b3=0), the output signal S312 of the comparator 312 is the logic "0" (cmp_b2=0), and the output signal S311 of the comparator 311 is the logic "1" (cmp_b1=1).

The quotient judgement data "judge" becomes noon when the output signals S311 to S313 of all of the comparators 311 to 313 are the logic "0" (cmp_b3=0, cmp_b2=0, cmp_b1=0).

The selector 317 selects a multiple 2B of the divisor B generated in the shifter 310 when receiving the upper one bit data of the judgement data "judge" of the selector 316 at the logic "1" at its control terminal and inputs the "0" data to an input terminal y of the three-input adder/subtractor 319 when receiving data at the logic "0".

The selector 318 selects the divisor B stored in the B register 221 when receiving the lower one bit data of the judgement data "judge" at the logic "1" of the selector 316 at the control terminal, while inputs "0" data to an input terminal z of the three-input adder/subtractor 319 when receiving the data at "0".

In the end, the following data is input to the input terminals y and z of the three-input adder/subtractor 319 in accordance with the contents of the quotient judgement data "judge".

when judge=11, y=2B and z=B when judge=11, y=2B and z=0 when judge=01, y=0 and z=B when judge=00, y=0 and z=0

The three-input adder/subtractor 319 receives as input the remainder R stored in the R register 222 at its input terminal x, a multiple 2B of the divisor B or non selectively output from the selector 317 at the input terminal as explained above, the divisor B or "0" selectively output from the selector 318 at the input terminal z and finds a new remainder $R-(y+z)=Re$ (N–digits) based on the formula $\{x-(y+z)\}$.

Note that the three-input adder/subtractor 319 simultaneously performs addition and subtraction by a single ripple carry.

Below, the principle of the three-input adder/subtractor 319 will be explained. Here, X, Y, and Z are M-digit signed binary numbers.

By using modification of 2's complement, $$X - (Y + Z) = X - Y - Z$$

$$= X + \sim Y + \sim Z + 10b$$

10b is a 2-bit binary number.

The M-digit binary numbers Co and S able to be represented by $X+\sim Y+\sim Z=2*Co+S$ are found.

Here, when representing the contents of S as Sm-1, ..., S1, S0 and the contents of Co as Cm-1, ..., C1, C0, the following addition is performed:

| Sm-1 | Sm-1 | Sm-2 | ⋯ | S2 | S1 | S0 |
|------|------|------|---|----|----|----|
| Cm-1 | Cm-2 | Cm-3 | ⋯ | C1 | C0 | 0 |
| +)   |      |      |   |    | 1  | 0  |

Here, {Sm-1, Sm-1, Sm-2, . . . , S2, S1} is made S' and S'+Co+1 is calculated by an M-digit adder with a carry input. The result is expressed as SUM.

The final result X−(Y+Z) can be obtained as a bit connection of

{SUM, S0}

Figure 10:
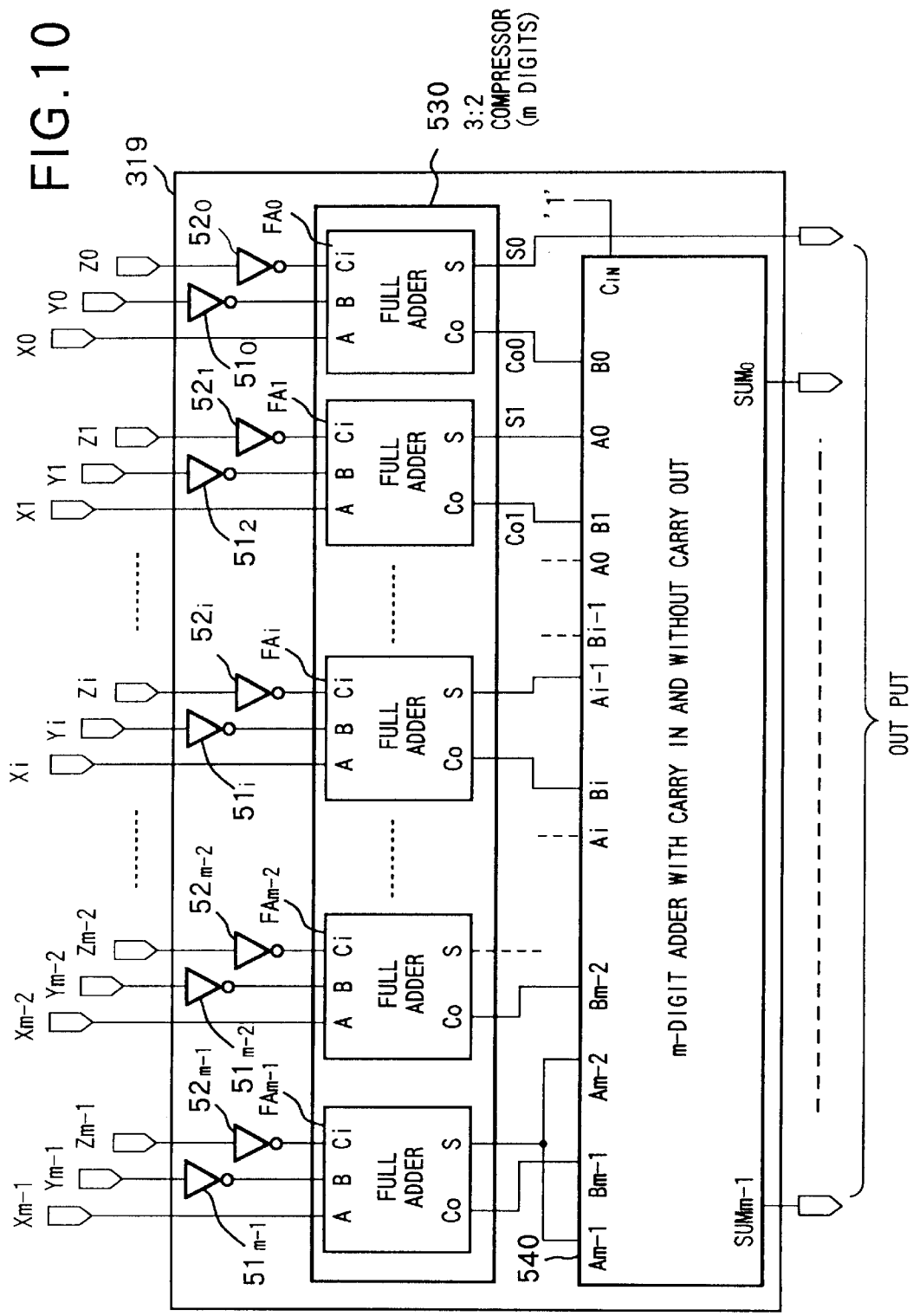
FIG. 10 is a circuit diagram of a specific example of the configuration of a three-input adder/subtractor according to the present invention.

FIG. 10 is a circuit diagram of a specific example of the configuration of an m-digit three-input adder according to the present invention.

The three-input adder/subtractor 319 is comprised by NOT gates 510 to 51m−1 for making "Y" "~Y", NOT gates 520 to 52m−1 for making "Z" "~Z", a 3:2 compressor 530, and an adder 540.

The 3:2 compressor 530, in the same way as the case of the three-input comparator 313, is comprised of the full adders FA0 to FAm−1 arranged corresponding to the number of digits.

The input terminals A of the full adders FA0 to FAm−1 receive as input a corresponding X (0 to m−1; 2B in FIG. 7), the input terminals B receive as input a ~Y (0 to m−1; inverted signal of output of selector 317 in FIG. 7) inverted in the NOT gates 510 to 51m−1, and the input terminals Ci receive as input ~Z (0 to m−1; inverted signal of output of selector 318 in FIG. 7) inverted in the NOT gates 520 to 52m−1.

The adder 540 is an adder having an m-digit carry-in and without a carry-out.

The input terminal Cin of the adder 540 always receives logic "1" data.

An input terminal B0 is connected to a terminal Co of the full adder FA0, and a terminal A0 is connected to a terminal S of the full adder FA1.

In the same way, an input terminal Bi−1 is connected to a terminal Co of an full adder FAi−1, an input terminal Ai−1 is connected to a terminal S of a full adder FAi, and an input terminal Bi is connected to a terminal Co of a terminal Co of a full adder FAi.

Further, an input terminal Bm−2 is connected to a terminal Co of a full adder FAm−2, input terminals Am−2 and Am−1 are connected to a terminal S of the full adder FAm−1, and an input terminal Bm−1 is connected to a terminal Co of the full adder FAm−1.

From the adder 540, m number of outputs SUM0 to SUMm−1 are output. These are supplied as a new remainder Re to the selector 218.

Also, an output of the terminal S of the full adder FA0 of the 3:2 compressor 530 is used as is as an output signal of the three-input adder/subtractor 319.

The matcher 320 receives as input the new remainder Re by the three-input adder/subtractor 319 and the quotient Q stored in the Q register and shifts the same by two bits to the left, and the bit matcher 320 generates a value NEXT_R of the next R register and outputs it to the selector 218.

The bit matcher 321 receives as input the quotient Q stored in the Q register 223 and the quotient judgement data "judge" by the selector 316 and shifts the same by two bits to the left so as to obtain a value NEXT_Q of the next Q register and outputs it to the selector 219, the sign inverter 214, and the selector 215.

Next, the operation due to the above configuration will be explained.

First Stage STG1

(1) In the exclusive OR gate 210, the sign bits (MSB) of the dividend A and divisor B are referred to, the sign of the quotient is found in advance, and the same is stored in the sign register 220 via the selector 216.

For example, when the sign of the quotient is negative, sign=1 is established.

(2) The absolute value of the dividend A is found by the absolute number generator 211 and stored in the Q register 223 via the selector 219.

(3) Similarly, the absolute value of the divisor B is obtained in the absolute number generator 212 and stored in the B register 221 via the selector 217.

The remainder R stored in the R register 222, the divisor B stored in the B register 221, and the quotient Q stored in the Q register 223 are supplied to the quotient/remainder judgement unit 213.

In the quotient/remainder judgement unit 213, the divisor B stored in the B register 221 is supplied to the shifter 310, an input terminal in of the comparator 311, and an input terminal in 2 of the three-input comparator 313, the remainder R stored in the R register 222 is supplied to the input terminal ref of the comparators 311 to 313 and an input terminal x of the three-input adder 319, and the quotient Q stored in the Q register 223 is supplied to the bit matcher 321.

Then, in the quotient/remainder judgement unit 213, the processing of the second stage STG2-1 is performed.

Second Stage STG2-1

(1) In the shifter 310, the divisor B stored in the B register 221 is shifted by one bit to generate 2B (N+1 digits) and it is supplied to the input terminal in of the comparator 312 and an input terminal in1 of the three-input comparator 313.

The following comparison operation is performed in parallel in the comparators 311 and 312 and three-input comparator 313.

The N-digit comparator 311 judges whether the divisor B supplied to the input terminal in is equal to or smaller than the remainder R supplied to the input terminal ref. When the judgement result is that the divisor B is equal to or smaller than the remainder R (in the case of an affirmative judgement result), the signal S311 is output to the control terminal of the selector 314 with the logic "1" (cmp_b1=1), while in the case of a negative judgement result, the signal S311 is output with the logic "0" (cmp_b1=0).

The (N+1)-digit comparator 312 judges whether the 2B supplied to the input terminal in is equal to or smaller than the remainder R. When the judgement result is that the multiple 2B of the divisor B is equal to or smaller than the remainder R (in the case of an affirmative judgement result), the signal S312 is output to the control terminal of the selector 315 with the logic "1" (cmp_b2=1), while in the case of a negative judgement result, the signal S312 is output with the logic "0" (cmp_b2=0).

In the (N+1)-digit three-input comparator 313, the (2B+B) and the remainder R supplied to the input terminal ref are compared to judge whether the (2B+B) is equal to or smaller than the remainder R without finding the sum of the 2B supplied to the input terminal in1 and the divisor B supplied to the input terminal in2.

When the judgement result is that 3B is equal to or smaller than the remainder R (in the case of an affirmative judgement result), the signal S313 is output to the control terminal of the selector 316 with the logic "1" (cmp_b3=1), while in the case of a negative judgement result, the signal S313 is output with the logic "0" (cmp_b3=0).

(2) In the selector 314, the 2-bit judgement data "01" is selected when receiving an output signal S311 of the comparator 311 at the logic "1" at its control terminal, while the 2-bit judgement data "00" is selected and output when receiving it at the logic "0".

In the selector 315, the 2-bit judgement data "01" is selected when receiving an output signal S312 of the comparator 312 at the logic "1" at its control terminal, while the 2-bit judgement data "01" or "00" selectively output from the selector 314 is selected and output when receiving it at the logic "0".

Also, in the selector 316, the 2-bit judgement data "11" is selected when receiving the output signal S313 of the comparator 313 at the logic "1" at its control terminal, while the 2-bit judgement data "10", "01", or "00" selectively output from the selector 315 is selected and output as the quotient judgement data "judge" to the bit matcher 321 when receiving it at the logic "0".

The upper one bit of the quotient judgement data "judge" is input to the control terminal of the selector 317 and the lower one bit is input to the control terminal of the selector 318.

When the quotient judgement data "judge" is "11", the data input to the control terminals of the selectors 317 and 318 are "11", so the output 2B from the shifter 310 is selected by the selector 317 and input to the input terminal y of the three-input adder/subtractor 319, while the divisor B stored in the B register is selected by the selector 318 and input to the input terminal z of the three-input adder/subtractor 319.

When the quotient judgement data "judge" is "10", the data to the control terminals of the selectors 317 and 318 are "10", so the output 2B of the shifter 310 is selected by the selector 317 and input to the input terminal y of the three-input adder/subtractor 319 and "0" is selected by the selector 318 and input to the input terminal z of the three-input adder/subtractor 319.

When the quotient judgement data "judge" is "01", the data to the control terminals of the selectors 317 and 318 are "01", so "0" is selected by the selector 317 and input to the input terminal y of the three-input adder/subtractor 319, while the divisor B stored in the B register 221 is-selected by the selector 318 and input to the input terminal z of the three-input adder/subtractor 319.

When the quotient judgement data "judge" is "00", the data to the control terminals of the selectors 317 and 318 are "10", so "0" is selected by the selector 317 and input to the input terminal y of the three-input adder/subtractor 319, while "0" is selected by the selector 318 and input to the input terminal z of the three-input adder/subtractor 319.

As a result, the input terminals y and z of the three-input adder/subtractor 319 are received as input the following data in accordance with the contents of the quotient judgement data "judge":

when judge=11, y=2B and z=B
when judge=10, y=2B and z=0
when judge=01, y=0 and z=B
when judge=00, y=0 and z=0

The three-input adder/subtractor 319 uses the remainder R stored in the R register 222 input in the input terminal x, the multiple 2B of the divisor B selectively output from the selector input from the input terminal y as explained above or "0", and the divisor B selectively output from the selector 318 input to the input terminal z or "0" to find a new remainder R−(y+z)=Re (N digits) based on the formula {x−(y+z)}.

At this time, the addition and subtraction are performed in parallel by a single ripple carry in the three-input adder/subtractor 319.

Third Stage STG3

(1) The new remainder Re from the three-input adder/subtractor 319 and the quotient Q stored in the Q register 223 are input to the bit matcher 320 and shifted the same by 2 bits to the left. As a result, the value NEXT_R of the next R register is generated.

Also, the quotient Q stored in the Q register 223 and the quotient judgement data "judge" from the selector 316 are input to the bit matcher 321 and shifted the same by 2 bits to the left. As a result, a value NEXT_Q of the next Q register is found.

Namely,

NEXT_R={(N−3)th to 0th digits of Re, (N−1)th to (N−2)th digits of Q}

NEXT_Q={(N−3)th to 0th digits of Q, judge}

(2) By referring to the sign stored in the sign register 220, the sign of the quotient is corrected by the sign inverter 214 and the selector 215, and the final quotient LAST_Q is found.

Namely, when sign=1 (negative case): LAST_Q=~NEXT_Q+1 (take 2's complement)

Note that "~" indicates inversion.

When sign=0 (not negative case): LAST_Q=~NEXT_Q (3) Then, NEXT_R, NEXT_Q are respectively entered into the R register 222 and Q register 223.

FIG. 11 is a view of the process of the operation of the divider according to the present embodiment.

As shown in FIG. 11, according to the divider 200 according to the present embodiment, it can be understood that a correct answer is found by the same process (FIG. 5) as by radix 4 division based on the prior art.

Figure 4:
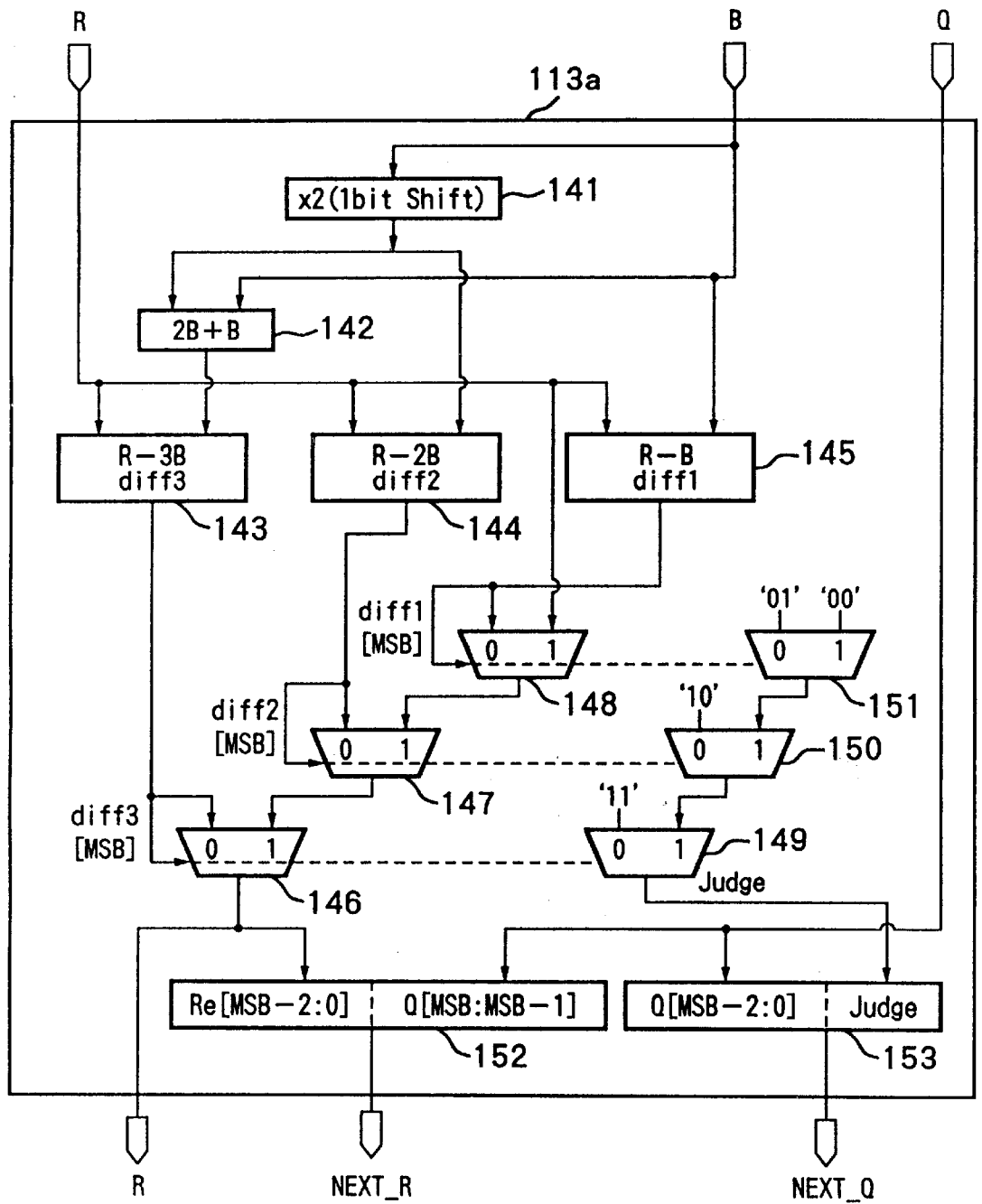
FIG. 4 is a circuit diagram of the conventional configuration of a quotient/remainder judgement unit of a radix 4 restoring division divider.

Also, the quotient/remainder judgement unit 213 of the radix 4 divider 200 shown in FIG. 7 according to the present embodiment is reduced in the size of the logic circuit compared with the radix 4 quotient/remainder judgement unit 113 shown in FIG. 4.

Below, it will be proved that the size of the circuit of the quotient/remainder judgement unit 213 is reduced by the size of the circuit of the radix 4 quotient/remainder judgement unit 113 shown in FIG. 4.

Note that the symbols ADDn+1 and CMPn+1 appearing below indicate the number of gates of the processor.

<Proof>
(Hypothesis)
In the case of the prior art, (N+1)-digit width adder for 2B+B . . . ADDn+1, one N-digit width subtractor for R−B . . . SUBn, one (N+1)-digit width subtractor for R−2B . . . SUBn+1, one (N+2)-digit width subtractor for R−3B . . . SUBn+2, one N-digit width 2:1 selector . . . SELn, three 2-digit width 2:1 selector . . . SEL2, three The total is made "J".
In the case of the present invention, (N+1)-digit comparator . . . CMPn+1, one N-digit comparator . . . CMPn, one (N+2)-digit three-input comparator ... TCMPn+1, one (N+1)-digit 2:1 selector ... SELn+1, two 2-digit 2:1 selector ... SEL2, three (N+1)-digit three-input adder/subtractor ... TADDn+1, one The total is made "K".

(1) First, consider the size of the selector.

$$J = J' + 3 \cdot SELn + 3 \cdot SEL2$$

$$K = K' + 2 \cdot SEL_{n+1} + 3 \cdot SEL2$$

Note that $$J' = ADD_{n+1} + SUBn + SUB_{n+1} + SUB_{n+2}$$

$$K' = TADD_{n+1} + CMPn + CMP_{n+1} + TCMP_{n+1}$$

Generally, when n is 3 or more, $$SELn \times 3 > SEL_{n+1} \times 2$$

Accordingly, when $J' \geqq K'$ is proved, J>K stands when n is three or more.

Below, the relationship of magnitude of "J'" and "K'" will be examined.

(2) Generally, a comparator outputs a sign bit of a subtraction result of two numbers. This state is equivalent to eliminating the logic irrelevant to generation of the most significant bit of the subtractor output.

While depending on the method of configuring the subtractor, the following relationship stands in a carry lookahead subtractor.

$$CMPn/SUBn = 0.4 \text{ to } 0.5 \quad (2\text{-}1)$$

Also, generally, the number of gates of an n-digit carry lookahead adder or carry lookahead subtractor is proportional to:

$$n \cdot \{(\log n) + 2\} \text{ (base of log is 2)}$$

There is not that great a difference in the number of gates between an adder and subtractor.

Thus, it is possible to make the proportional constant "k" and express this as:

$$ADDn, SUBn = k \times n \cdot \{(\log n) + 2\} \quad (2\text{-}2)$$

The n-digit three-input adder/subtractor is, as shown in FIG. 11, nothing more than an n-digit adder plus an n-digit 3:2 compressor (n number of full adders).

Thus, from the above formula (2-2), it is possible to express this as:

$$TADDn = k \times n \cdot \{(\log n) + 3\} \quad (2\text{-}3)$$

The n-digit three-input comparator is, as shown in FIG. 8, comprised of a comparator plus a 3:2 compressor, so from the above formula (2-1), when assuming use of 0.5, $$TCMPn = SUBn \times 0.5 + nk \quad (2\text{-}4)$$

The nk is a 3:2 compressor.

When summing up the above estimations, $$\begin{aligned}
J' &= k \times (n+1) \cdot \{(\log n + 1) + 2\} \ldots \text{using formula (2-2)} + \\
&\quad k \times (n) \cdot \{(\log n) + 2\} \ldots \text{using formula (2-2)} + \\
&\quad k \times (n+1) \cdot \{(\log n + 1) + 2\} \ldots \text{using formula (2-2)} + \\
&\quad k \times (n+2) \cdot \{(\log n + 2) + 2\} \ldots \text{using formula (2-2)}
\end{aligned}$$

$$\begin{aligned}
K' &= k \times (n+1) \cdot \{(\log n + 1) + 3\} \ldots \text{using formula (2-3)} + \\
&\quad k \times (n) \cdot \{(\log n) + 2\} \times 0.5 \ldots \text{using formula (2-1)} + \\
&\quad k \times (n+1) \cdot \{(\log n + 1) + 2\} \times 0.5 \ldots \text{using formula (2-1)} + \\
&\quad k \times (n+1) \cdot \{(\log n + 1) + 2\} \times 0.5 \ldots \text{using (2-4) formula}
\end{aligned}$$

$$\begin{aligned}
&= k \times (n+1) \cdot \{(\log n + 1) + 2\} + k(n+1) + \\
&\quad k \times (n) \cdot \{(\log n) + 2\} \times 0.5 + \\
&\quad k \times (n+1) \cdot \{(\log n + 1) + 2\} \times 0.5 + \\
&\quad k \times (n+1) \cdot \{(\log n + 1) + 2\} \times 0.5 + nk
\end{aligned}$$

$$\begin{aligned}
J' - K' &= -k(n+1) + \\
&\quad k \times (n) \cdot \{(\log n) + 2\} \times 0.5 + \\
&\quad k \times (n+1) \cdot \{(\log n + 1) + 2\} \times 0.5 + \\
&\quad W - nk
\end{aligned}$$

Here, $$\begin{aligned}
W &= k \times (n+2) \cdot \{(\log n + 2) + 2\} - \\
&\quad k \times (n+1) \cdot \{(\log n + 1) + 2\} \times 0.5
\end{aligned} \quad (2\text{-}5)$$

Clearly, $W > 0$ $$\begin{aligned}
J' - K' &= \\
&\quad +W + \\
&\quad k \times (n) \cdot \{(\log n) + 2\} \times 0.5 + \\
&\quad k \times (n+1) \cdot \{(\log n + 1) + 2\} \times 0.5 - \\
&\quad k(2n+1)
\end{aligned}$$

Here, assume $$\begin{aligned}
J' - K' &= W + U \\
U &= V - k(2n+1) \\
V &= k \times (n) \cdot \{(\log n) + 2\} \times 0.5 + \\
&\quad k \times (n+1) \cdot \{(\log n + 1) + 2\} \times 0.5
\end{aligned}$$

$$\begin{aligned}
V > V' &= k \times n \cdot \{(\log n) + 2\} \times 0.5 + \\
&\quad k \times n \cdot \{(\log n) + 2\} \times 0.5 \\
&= k \times n \cdot \{(\log n) + 2\} \\
&= kn(\log n) + 2kn
\end{aligned}$$

$$\begin{aligned}
V' - k(2n+1) &= kn(\log n) + 2kn - k(2n+1) \\
&= kn(\log n) - k
\end{aligned}$$

When n is 2 or more, $$V' - k(2n+1) >$$

always stands.

Accordingly, $$V > V' > k(2n+1) \text{ and } U > V - k(2n+1) > 0 \quad (2\text{-}6)$$

stand.

As a result of the above, from formula (2-5) and formula (2-6), $W > 0$ and $U > 0$ (when n is 3 or more)

stand and $$J'-K'=W+U>0 \text{ (when } n \text{ is 3 more)}$$

Accordingly, $$J'>K' \text{ (when } n \text{ is 3 or more)}$$

stands.

As in the conclusion of (1), when $$J'>K'$$

$$J>K$$

always stands.

<End of Proof>

Note that in the present embodiment, an explanation was made of an example of a radix 4 (or radix 8) divider, however, needless to say the present invention can be applied to other high order radix dividers as well.

Note that, for example, in the case of a radix 16, it is necessary to prepare B, 2B, 4B, 8B, and 16B by bit shifting. At this time, $$8B$$

$$9B=8B+B$$

$$10B=8B+2B$$

$$11B=8B+2B+B$$

$$12B=8B+4B$$

$$13B=8B+4B+B$$

$$14B=16B-2B$$

$$15B=16B-B$$

The problem here is that, when comparing remainders of 11B and 13B, a four-input comparator, not a three-input comparator, is necessary.

Note that a five-input comparator is necessary in a case of a radix 32.

By further adding a 3:2 compressor to an input stage of the three-input comparator, it is possible in principle to expand the comparator to a four-input comparator or a five-input comparator.

Also, in the above embodiments, the explanation was made of a radix 4 three-input adder/subtractor for realizing $$X-(2B+B)$$

but when realizing radix 8 division, a four-input adder/subtractor is necessary for realizing $$X-(4B+2B+B)$$

A four-input adder/subtractor can be realized by providing a 3:2 compressor before the three-input adder/subtractor.

Namely, this is configured to be a "3:2 compressor+3:2 compressor+adder".

The principle of an (X−(Y+Z+W)) four-input adder/subtractor will be explained below.

By modification of the 2's complement, $$X-Y-Z-W=X+\sim Y+\sim Z+\sim W+1+1+1$$

The 3:2 compressor is used to convert (X+~Y+~Z) to the two binary numbers (C1, S1) as follows:

$$X+\sim Y+\sim Z=2\cdot C1+S1$$

wherein, "2·" means shifting one bit to the left with respect to C1.

Furthermore, the 3:2 compressor is used to convert (2·C1+S1+~W) to two binary numbers (C2, S2).

At this time, the input to the 3:2 compressor becomes as follows:

|  | MSB | Digit |  | LSB |
|---|---|---|---|---|
| S1: | * | s  s | ... | s |
| C1: | c | c | ... | c  1 |
| +) ~W: | * | w  w | ... | w |

Note that C1 is shifted by one bit to the left with respect to S1 and ~W, and "1" is inserted to the LSB after being shifted.

Also, "*" realizes sign expansion of the most significant bit (MSB), while "1" at the end of C1 realizes "+1" of the 2's complement.

Similarly, the following relationship stands:

$$(2C1+S1+\sim W)=2\cdot C2+S2$$

Finally, there is the input to the final adder. The input is as follows, including a carry input Cin of the adder:

|  | MSB | digit |  | LSB |
|---|---|---|---|---|
| S2: | * | s  s | ... | s |
| C2: | c | c | ... | ...c  1 |
| Cin of adder: |  |  |  | 1 |

Here, "*" realizes sign expansion of the most significant bit (MSB), the "1" at the end of C1 realizes "+1" of the 2's complement, and the "1" of Cin realizes the "+1" of the 2's complement.

C2 is shifted by one bit to the left with respect to S2, and "1" is inserted to the LSB after the shifting.

Due to the above, the "+1" for the 2's complement is performed three times, so $$S-Y-Z-W$$

can be correctly obtained.

In this case as well, it is possible to reduce the size of the circuit of the quotient/remainder judgement unit of a high radix divider.

Summarizing the effects of the invention, as explained above, according to the present invention, there is the advantage that the size of the circuit of the quotient/remainder judgement unit of the high radix divider can be reduced.

While the invention has been described with reference to specific embodiment chosen for purpose of illustration, it should be apparent that numerous modifications could be made thereto by those skilled in the art without departing from the basic concept and scope of the invention.

What is claimed is:

1. A high radix divider for radix $2^k$ division of a dividend A by a divisor B to find a quotient for k number of bits at a time, comprising: a multiple generating means for shifting bits of said divisor B to generate $2^s \times B$ (s is a non-negative integer including "0" and $s \leq k$);

a first comparator for receiving as input the divisor B and a remainder R, judging whether the divisor B is equal to or smaller than the remainder R, and outputting the judgement result;

at least one second comparator for receiving as input the $2^s \times B$ generated by said multiple generating means and the remainder R, judging whether $2^s \times B$ is equal to or smaller than the remainder R, and outputting the judgement result;

at least one three-input comparator having a 3:2 compressor stage for receiving as input $2^s \times B$, $+/-2^t(t<s) \times B$ and a remainder R as three m-bit width binary numbers, converting three m-bit width binary numbers to two m-bit width binary numbers (Co, S), and outputting the two m-bit width binary numbers, and a non-negative judgement stage for judging whether a difference of the three m-bit width binary number is non-negative based on said two binary numbers (Co, S) output from said 3:2 compressor stage;

a selection circuit for obtaining a first output y selecting one of $2^s \times B$ and "0" and a second output z selecting one of the divisor B and "0" in accordance with a comparison result of said three-input comparator, second comparator, and first comparator;

a three-input adder/subtractor for receiving as input the remainder R and first output and second output of said selection circuit as three m-bit width binary numbers and performing complex addition and subtraction of $\{R-(y+z)\}$ in parallel by a single ripple carry to find a new remainder Re; and a matcher for performing bit matching in accordance with a comparison result of said three-input comparator, second comparator, and first comparator to determine a quotient Q.

2. A high radix divider as set forth in claim 1, wherein:

said 3:2 compressor stage of said three-input comparator comprises an m-bit with 3:2 compressor for receiving as input two binary numbers $2^s \times B$ and $+/-2^t (t<s) \times B$ as they are for each bit and for receiving as input one binary number R by taking a negation of each bit.

3. A high radix divider as set forth in claim 2, wherein:

a non-negative judgement stage of said three-input comparator comprises an m-digit adder having 0 to m−1 number of inputs A and inputs B forming m number of pairs and a carry-in input Cin, has the 0th-digit S-output of said 3:2 compressor stage as the input of the carry-in input Cin, has the corresponding 0th to (m−1)th digit Co outputs as the B0 to Bm−1 inputs, has the i(i<m)th digit S-output as the (i−1) A-input, and has the (m−1) digit S-output as the Am−1 input and said three-input comparator judges and outputs the (m−1) th digit SUMm−1 of an addition output of said adder.

4. A high radix divider as set forth in claim 3, wherein:

said m-digit adder comprises only by logic gates relating to generation of an (m−1)th digit SUMm−1 of the addition output.

5. A high radix divider as set forth in claim 1, wherein:

said three-input adder/subtractor comprises a 3:2 compressor stage for converting a total of three m-bit width binary numbers to two m-bit width binary numbers (Co, S) for output and an m-digit adder for finding the sum of the digits based on said two binary numbers (Co, S) output from said 3:2 compressor stage.

6. A high radix divider as set forth in claim 5, wherein:

said 3:2 compressor stage of said three-input adder/subtractor comprises an m-bit width 3:2 compressor receiving as input one binary number R as it is for each bit and receiving as input two binary numbers y and z by taking a negation of each bit.

7. A high radix divider as set forth in claim 6, wherein:

an m-digit adder of said three-input adder/subtractor has 0 to m−1 number of inputs A and inputs B forming m number of pairs and a carry-in input Cin, has a logic "1" as the input of a carry-in input Cin, has the corresponding 0th digit to (m−1) digit Co outputs as the B0 to Bm−1 inputs, has the i(i<m)th digit S outputs as the (i−1) number of A inputs, and has the (m−1)-digit S outputs as the Am−1 number of inputs and said three-input adder/subtractor uses the SUM0 to SUMm−1 of the addition outputs of said m-digit adder and the 0th digit S output of the 3:2 compressor as the output of the result of addition/subtraction.

8. A high radix divider as set forth in claim 5, wherein said selection circuit comprises:

a first selector for selecting one of different k-bit first and second judgement data in accordance with a judgement result of said first comparator;

a second selector for selecting one of a further different k-bit third judgement data and the first or second judgement data selected by said first selector in accordance with a judgement result of said second comparator;

a third selector for selecting one of a further different fourth judgement data and the first, second, or third judgement data selected by said second selector in accordance with a judgement result of said three-input comparator and outputting the selected data to the matcher as quotient judgement data;

a fourth selector for selecting one of $2^s \times B$ or "0" based on an upper bit of said quotient judgement data to select said first output y; and a fifth selector for selecting one of B or "0" based on a lower bit of said quotient judgement data to select said second output z.

9. A high radix divider as set forth in claim 8, wherein:

said selection circuit selects the fourth judgement data as quotient judgement data regardless of a judgement result of said second and first comparators when obtaining a judgement result that (B+2B) is equal to or smaller than a remainder R in said three-input comparator and obtaining a judgement result that ($2^s \times B$) is equal to or smaller than a remainder R in said second comparator, selects the third judgement data as quotient judgement data regardless of a judgement result of said first comparator when obtaining a judgement result that (B+2B) is larger than a remainder R in the three-input comparator and obtaining a judgement result that ($2^s \times B$) is equal to or smaller than a remainder R in said second comparator, and selects the first or second judgement data as quotient judgement data when obtaining a judgement result that $2^s \times B$ is larger than a remainder R in said second comparator.

10. A high radix divider as set forth in claim 1, wherein said selection circuit comprises:

a first selector for selecting one of different k-bit first and second judgement data in accordance with a judgement result of said first comparator;

a second selector for selecting one of a further different k-bit third judgement data and the first or second judgement data selected by said first selector in accordance with a judgement result of said second comparator;

a third selector for selecting one of a further different fourth judgement data and the first, second, or third judgement data selected by said second selector in accordance with a judgement result of said three-input comparator and outputting the selected data to said matcher as quotient judgement data;

a fourth selector for selecting one of $2^s \times B$ or "0" based on an upper bit of said quotient judgement data to select said first output y; and a fifth selector for selecting one of B or "0" based on a lower bit of said quotient judgement data to select said second output z.

11. A high radix divider as set forth in claim 10, wherein:

said selection circuit selects the fourth judgement data as quotient judgement data regardless of a judgement result of said second and first comparators when obtaining a judgement result that (B+2B) is equal to or smaller than a remainder R in said three-input comparator, selects the third judgement data as quotient judgement data regardless of a judgement result of said first comparator when obtaining a judgement result that (B+2B) is larger than a remainder R in the three-input comparator and obtaining a judgement result that ($2^s \times B$) is equal to or smaller than a remainder R in said second comparator, and selects the first or second judgement data as quotient judgement data when obtaining a judgement result that $2^s \times B$ is larger than a remainder R in said second comparator.

12. A high radix divider for radix 4 division of a dividend A by a divisor B to find a quotient for 2 number of bits at a time, comprising:

a multiple generating means for shifting the bits of said divisor B to generate 2B;

a first comparator for receiving as input the divisor B and a remainder R, judging whether the divisor B is equal to or smaller than the remainder R, and outputting the judgement result;

a second comparator for receiving as input the 2B generated by said multiple remainder R, and outputting the judgement result;

a three-input comparator comprising a 3:2 compressor stage for receiving as input the 2B, B, and a remainder R as three m-bit width binary numbers, converting the three m-bit width binary numbers to two m-bit width binary numbers (Co, S), and outputting the two m-bit width binary numbers and a non-negative judgement stage for judging whether or not a difference of the three m-bit width binary number is non-negative based on said two binary numbers (Co, S) output from said 3:2 compressor stage;

a selection circuit for obtaining a first output y selecting one of 2B and "0" and a second output z selecting one of the divisor B and "0" in accordance with a comparison result of said three-input comparator, second comparator, and a third comparator;

a three-input adder/subtractor for receiving as input a remainder R and the first output y and second output z of said selection circuit as three m-bit width binary numbers and performing complex addition and subtraction of {R−(y+z)} in parallel by a single ripple carry to find a new remainder Re; and a matcher for performing bit matching to determine a quotient Q in accordance with a comparison result of said three-input comparator, second comparator, and first comparator.

13. A high radix division method for radix $2^k$ division of a dividend A by a divisor B to find a quotient by k number of bits at a time, including:

a step of shifting the bits of said divisor B to generate $2^s \times B$ (s is a non-negative integer including "0" on and $s \leq k$);

a first comparison step of comparing the divisor B and a remainder R to judge whether the divisor B is equal to or smaller than the remainder R;

a second comparison step of comparing $2^s \times B$ and the remainder R to judge whether $2^s \times B$ is equal to or smaller than the remainder R;

a third comparison step of converting a total of $2^s \times B$, $+/-2^t (t<s) \times B$, and the remainder R as three m-bit width binary numbers to two m-bit width binary numbers (Co, S) and judging whether said total value is non-negative based on said two binary numbers (Co, S);

a step of obtaining a y selecting one of $2^s \times B$ or "0" and z selecting one of B or "0" in accordance with a comparison result of said third, second, and first comparison steps;

a step of performing complex addition and subtraction of {R−(y+z)} in parallel by a single ripple carry to find a new remainder Re; and a step of performing bit matching to determine a quotient Q in accordance with a comparison result of said third, second, and first comparison steps;

wherein said first comparison step, second comparison step, and third comparison step are performed in parallel.

\* \* \* \* \*